(12) United States Patent
Bradford, III et al.

(10) Patent No.: US 10,754,682 B2
(45) Date of Patent: Aug. 25, 2020

(54) SNOW SKI TRAINING APPARATUS AND METHODS OF USE

(71) Applicants: Henry Bernard Bradford, III, Staunton, VA (US); Sandra Jean Catchings, Staunton, VA (US); William Catchings Bradford, Staunton, VA (US)

(72) Inventors: Henry Bernard Bradford, III, Staunton, VA (US); Sandra Jean Catchings, Staunton, VA (US); William Catchings Bradford, Staunton, VA (US)

( * ) Notice: Subject to any disclaimer, the term of this patent is extended or adjusted under 35 U.S.C. 154(b) by 1021 days.

(21) Appl. No.: 14/953,149

(22) Filed: Nov. 27, 2015

(65) Prior Publication Data

US 2016/0144257 A1 May 26, 2016

Related U.S. Application Data

(60) Provisional application No. 62/084,557, filed on Nov. 26, 2014.

(51) Int. Cl.
*A63B 69/18* (2006.01)
*G06F 9/46* (2006.01)
*G06F 12/0817* (2016.01)
*G06F 12/084* (2016.01)

(52) U.S. Cl.
CPC ............. *G06F 9/467* (2013.01); *A63B 69/18* (2013.01); *G06F 12/084* (2013.01); *G06F 12/0828* (2013.01); *G06F 2212/314* (2013.01); *G06F 2212/621* (2013.01)

(58) Field of Classification Search
CPC ..... A63B 69/18; A63B 69/182; A63B 69/187; A63B 2069/185
USPC ........................................................ 434/253
See application file for complete search history.

(56) References Cited

U.S. PATENT DOCUMENTS

| 2,274,081 | A | * | 2/1942 | Mautin | .................. | A63B 69/18 |
| | | | | | | 434/253 |
| 2,657,055 | A | * | 10/1953 | Denham | ................ | A63B 69/18 |
| | | | | | | 434/253 |
| 3,467,374 | A | * | 9/1969 | Auer | ...................... | A63B 69/18 |
| | | | | | | 482/123 |

(Continued)

*Primary Examiner* — Joseph B Baldori
(74) *Attorney, Agent, or Firm* — Norton IP Law Firm LLC; Taylor M. Norton

(57) ABSTRACT

An snow ski training apparatus and methods of use are provided comprising a longitudinal T-beam having a central axis aligned generally between front and rear vertical supports, with a sliding pivot point assembly operatively engaging the T-beam for longitudinal movement. A pair of unparallel ski arms are provided, each having a plurality of axially spaced holes along the length of each respective ski arm, which are pivotally mounted overlapping each other on the sliding pivot point assembly enabling each ski arm to freely and independently pivot around the same vertical axis point. A foot pad is selectively configured at the tail end of each ski arm, enabling a user's feet to rotate along the same, congruent and overlapping arc. An achievement disc is provided concentrically with the sliding pivot point assembly enabling correlation between angles achieved by a user in operation of the apparatus with varying degrees of difficulty of downhill turns in assimilation of parallel snow skiing.

9 Claims, 19 Drawing Sheets

(56) References Cited

U.S. PATENT DOCUMENTS

| | | | | | |
|---|---|---|---|---|---|
| 3,475,021 | A | * | 10/1969 | Ruegsegger | A63B 69/18 482/70 |
| 3,531,110 | A | * | 9/1970 | Marchu | A63B 69/18 482/146 |
| 3,591,172 | A | * | 7/1971 | Hude | A63B 69/18 482/130 |
| 3,650,528 | A | * | 3/1972 | Natterer | A63B 69/18 482/71 |
| 3,707,283 | A | * | 12/1972 | Cormier | A63B 69/18 482/71 |
| 3,708,163 | A | * | 1/1973 | Hynes | A63B 69/18 482/71 |
| 4,342,453 | A | * | 8/1982 | Wagner | A63B 69/18 434/253 |
| 4,396,189 | A | * | 8/1983 | Jenkins | A63B 69/18 434/253 |
| 4,453,742 | A | * | 6/1984 | Zepkowski | A63C 5/16 280/22.1 |
| 4,595,195 | A | * | 6/1986 | Miehlich | A63B 69/18 434/253 |
| 4,607,839 | A | * | 8/1986 | Knudson | A63B 69/18 482/71 |
| 4,645,202 | A | * | 2/1987 | Tomba | A63B 69/18 482/71 |
| 4,669,723 | A | * | 6/1987 | Arsenian | A63B 69/18 482/71 |
| 4,744,557 | A | * | 5/1988 | Smirmaul | A63B 69/18 434/253 |
| 4,795,146 | A | * | 1/1989 | Donnerstag | A63B 22/0061 434/253 |
| 4,846,463 | A | * | 7/1989 | Kleinnibbelink | A63B 69/18 482/71 |
| 4,869,496 | A | * | 9/1989 | Colombo | A63B 69/18 482/71 |
| 4,993,704 | A | * | 2/1991 | Luczynski | A63B 69/18 434/253 |
| 5,284,460 | A | * | 2/1994 | Miller | A63B 21/151 482/145 |
| 5,316,530 | A | * | 5/1994 | Romer | A63B 69/18 482/130 |
| 5,374,228 | A | * | 12/1994 | Buisman | A63B 69/18 482/51 |
| 5,391,130 | A | * | 2/1995 | Green | A63B 21/00072 482/112 |
| 5,496,239 | A | * | 3/1996 | Kallman | G09B 9/02 482/51 |
| 5,692,995 | A | * | 12/1997 | Alvarez | A63B 22/0069 434/253 |
| 5,749,811 | A | * | 5/1998 | Wilson | A63B 69/18 434/253 |
| 5,895,340 | A | * | 4/1999 | Keller | A63B 24/00 434/253 |
| 5,911,650 | A | * | 6/1999 | Cox | A63B 21/023 482/51 |
| 6,106,442 | A | * | 8/2000 | Tissue | A63B 21/157 482/51 |
| 6,231,484 | B1 | * | 5/2001 | Gordon | A63B 69/18 482/51 |
| 7,115,073 | B2 | * | 10/2006 | Nizamuddin | A63B 21/055 482/51 |
| 9,682,278 | B2 | * | 6/2017 | Jones | A63B 22/0061 |
| 2005/0266964 | A1 | * | 12/2005 | Teng | A63B 22/0061 482/71 |
| 2012/0270194 | A1 | * | 10/2012 | Kuijpers | A63B 21/0053 434/253 |

\* cited by examiner

SNOW SKI TRAINING APPARATUS AND METHODS OF USE

CROSS-REFERENCE TO RELATED APPLICATION

This application claims the benefit of priority of U.S. Provisional Application No. 62/084,557 filed Nov. 26, 2014, of which all of the contents are hereby incorporated by reference.

FIELD OF INVENTION

In present invention relates generally to training and exercising devices for snow skiers. More specifically, the present invention relates to devices providing pivoting motions affording a person an opportunity to learn to snow ski through guided muscle learning.

BACKGROUND

In recent years, ski-training devices have become increasingly popular. A number of devices have been developed to facilitate the practice of snow skiing.

Previous inventions in this field have covered individual skiing motions, but have been unable to provide the sum total motion of parallel snow skiing. A few of these previous simulators have a fixed vertical structural arc in the middle of the device in the center plane of the user, producing an unnatural motion for the skiers feet to climb and causing his or her weight to be unintentionally thrown backwards.

Other devices have all suffered from many disadvantages, and particularly from the lack of adjustability and flexibility. It would therefore be desirable to provide methods and an apparatus that allows for more of a direction correlation to how a skier learns to ski and how a skier's feet actually move as a skier's feet slide across snow.

Some current ski devices have a pivot point on a track structure directly under the center of the foot and others have two foot pedals directed connected, allowing for no independent action. Embodiments of the snow ski training apparatus of the present invention have a more improved duplication of actual snow skiing because the true radial pivot point for learning to parallel ski is established at the front of the ski of both feet operating independently.

While some of the state of the art ski devices supply their own power and motion for the skier to follow, in actual snow skiing, the snow skier supplies the power and motion for each turn. Another objective of the snow ski training apparatus of the present invention is to train and exercise the specific muscles needed to downhill parallel snow ski, which embodiments of the present invention accomplish by allowing the skier to initiate the requisite power in each gently guided turn.

The ski machine of this present invention overcomes prior limitations and obstacles by mixing all elements of parallel skiing into a smoothly combined side to side, up to down, and front to back motion, duplicating the same type of physical movement encountered while actually downhill parallel skiing in the snow.

When a user adopts and implements the movement he/she learns on the snow ski training apparatus of the present invention to actual downhill snow skiing, he/she will have learned to parallel snow ski much more easily, safer and quicker.

SUMMARY OF THE INVENTION

Embodiments of the present invention are directed to a snow ski training apparatus and methods of teaching snow skiing as disclosed herein, which allows a skier to learn and train on how to snow ski quicker and more accurately than was possible before.

In a preferred embodiment, unparallel ski arms are rotationally disposed on a sliding pivot point assembly. In a preferred embodiment, the ski arms selectively overlap substantially near the nose of the ski arms, at a point that closely surrounds and connects to the pivot shaft of the sliding pivot point assembly. In such an embodiment, the ski arms do not move parallel to one another, yet embodiments of the present invention provide an improved ski training apparatus and enable an improved teaching of downhill parallel snow skiing.

In a preferred embodiment, the frame of the sliding pivot point assembly generally has the form of a reverse U-shaped frame, and a cylindrical shaft is connected to the pivot point frame which glidingly engages a plurality of roller wheels enabling axial movement of the pivot point assembly in the longitudinal direction of a T-Beam which supports the sliding pivot point assembly.

Preferably, there are four roller wheels engaging the bottom surface of the flange of the T-beam, where those roller wheels are positioned between each side wall of the reverse U-shaped frame. Preferably, there is one roller wheel engaging the top surface of the flange of the T-beam, such roller wheel being positioned between the two opposing vertical walls of the reverse U-shaped frame. From a side view, in a preferred embodiment, the frame of the assembly has a substantially trapezoidal shape. The bottom rollers operationally engage the bottom side of the flange of the T-Beam, and the top roller wheel engages the top side of the flange of the T-Beam.

In embodiments of the present invention, the skier's body (frontal or coronal plane) is free to move forward and backward, as the sliding pivot point assembly slideably moves forward and backward along the horizontal T-beam member in relation to the ground.

Embodiments of the present invention overcome prior obstacles since the sliding pivot point assembly comprises a vertically extending cylindrical pivot point shaft fixed atop the support frame providing a single pivot point vertical axis that is capable of longitudinal movement (as described in further detail below along with drawings) along the longitudinal axis of the T-beam.

Preferably, the ski arms are provided with adjustment holes spaced axially along the longitudinal axis of each respective ski arm, to allow for adjustment in length of each ski arm with respect to the sliding pivot point axis, where such length is measured between the selected hole of the ski arm positioned around the vertical pivot point shaft to the tail end of the ski arm to which a foot pad is connected and selectively positioned.

In a preferred embodiment, there is an elastic band attached on one end to an eye-bolt extending above the front column support of the apparatus and the other end of the elastic band is securely laced around the lower section of the cylindrical pivot point shaft. The elastic band enables repositioning of the sliding pivot point assembly during training and operation of the ski training apparatus by the user.

One embodiment of the present invention provides for an interchangeable landing base pad, that has the nature of a cushion, attached to the bottom of the foot pad. The landing base pad is interchangeable such that users can interchange the base pads so as to utilize different pads having varying widths.

For the method claim, vertically free floatingly positioned above the ground means that there is no vertical load bearing support structure beneath the foot pads, and the foot pads are in an elevated position elevated above the ground.

A method for teaching the art of parallel snow skiing is provided using the disclosed embodiments of the ski trainer apparatus having two elongated and unparallel ski arms. Each ski arm has a foot pad connected to a heel rest with laces configured to receive a foot of a user at the tail end of each ski arm. A user places his/her feet securely upon the two footpads selectively attached to the ends of the respective ski arms, which are freely rotatable and overlap each other at a point where the ski arms are pivotally mounted to a single vertical pivot point shaft that is fixed to the sliding pivotal point assembly, enabling the foot pads to rotate about the same pivot point, and thus enabling the foot pads and respective feet of the user of the ski training apparatus to rotate along the same, congruent and overlapping arc.

In a preferred embodiment, the sliding pivot point assembly is configured for movement along a longitudinal axis of a supporting T-beam, thereby allowing the user's body and feet to actually move backward and forward through the user's frontal (or coronal) plane, while also radially guiding and maintaining both of the user's feet within the same overlapping arc.

One preferred embodiment of the present invention provides for an interchangeable landing base cushion pad, attached to the bottom of the foot pad by fasteners, where each interchangeable landing base pad could be a different width. In a preferred embodiment, each foot pad preferably comprises a landing base cushion pad beneath the foot pad to engage the ground and provide stability to a user as well as to absorb impact during a landing of a user during methods of operation of the ski training apparatus.

Since the landing base pad can be of interchangeable widths, one embodiment of the present invention would facilitate better balance for the user depending on the strength, skill level, and experience of the user. For example, in one embodiment, a novice user, or a user with weak ankles, could preferably utilize a wide landing base pad, which would allow for additional stability, in the operation of the ski training apparatus. An experienced user, or a user with strong ankles, could preferably utilize a narrow landing base pad, which would require more balance by the user and allow for motion more similar to actual downhill snow skiing. In a steady position, the landing base pad rests and balances upon the ground.

In embodiments of the present invention, a user does not ride side to side on the tracks of a machine like in current ski devices, but instead the skier is allowed to freely jump side to side closely mimicking the movement of parallel snow skiing. Jumping laterally means jumping in a direction oriented through the user's median or sagittal plane.

In a preferred embodiment, an achievement disc is fixed to the lower section of the cylindrical pivot point shaft, and the achievement disc has a plurality of markings of angles inscribed thereon providing correlation between angles achieved in operation of the apparatus with varying degrees of difficulty of downhill turns in assimilation of parallel snow skiing.

These and other features, aspects, and advantages of the present invention will become better understood with reference to the following description and appended claims.

BRIEF DESCRIPTION OF THE DRAWINGS

The preferred embodiments of the present invention are illustrated by way of example and not limited to the following figures.

DETAILED DESCRIPTION OF THE INVENTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

For purposes of clarity and orientation with respect to a person, referred to herein as a user, it is noted that a transverse (also known as axial or horizontal) plane is an X-Z plane, parallel to the ground (which in humans separates the superior from the inferior, or put another way, the head from the feet). A frontal (also known as coronal) plane is a Y-X plane, perpendicular to the ground, which (in humans) separates the anterior from the posterior, the front from the back, the ventral from the dorsal. A sagittal (also known as lateral) plane is an Y-Z plane, perpendicular to the ground, which separates left from right.

Referring initially to FIGS. 1-4, the basic constructional details and principles of operation of the ski training apparatus 100 for learning the art of parallel snow skiing according to a preferred embodiment of the present invention will be discussed.

Figure 1:
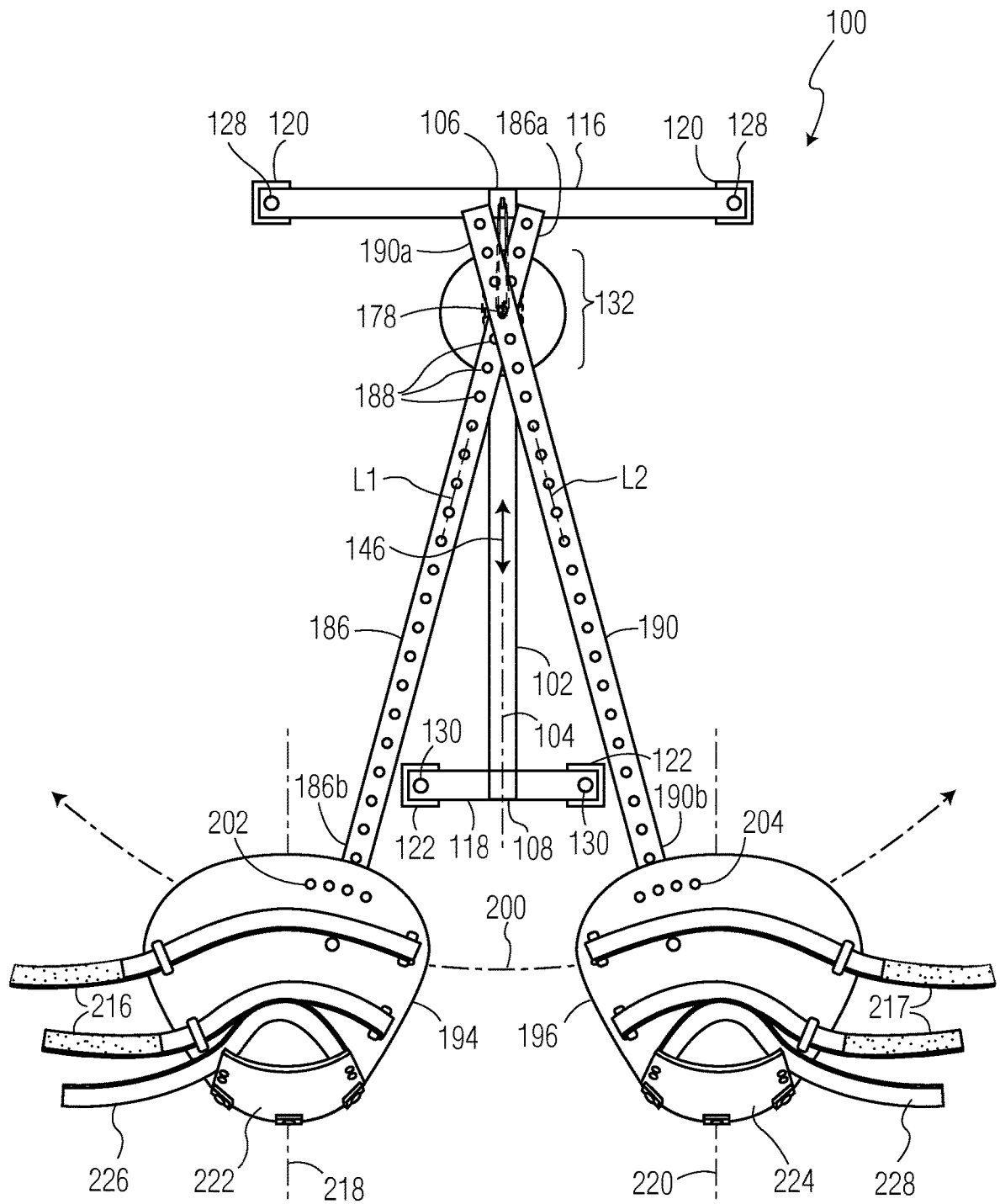
FIG. 1 illustrates a top view of an exemplary ski trainer apparatus, according to a preferred embodiment of the present invention.

In FIG. 1, a ski training apparatus 100 according to a preferred embodiment of the present invention is provided. In FIG. 1, the ski training apparatus 100 comprises a longitudinal T-beam 102 having a central axis 104 aligned generally from front to rear of the apparatus 100, and the T-beam 100 is mounted and supported between a front support column 106 and a rear support column 108. The front column 106 and rear column 108 are disposed vertically in relation to the ground 110. The front column 106 preferably comprises a vertically extending eye-bolt 107 positioned above the horizontal (axial) plane of the top of the T-beam 100, as can be seen in FIG. 2.

In one embodiment, for additional stability of the support columns 106, 108 connected to each end of the T-beam 102, the support columns 106, 108 rest atop wide pads 113, 115 disposed on the ground 110 directly beneath and substantially perpendicular to the support columns 106, 108. In another embodiment, the front column 106 and rear column 108 are configured to have spike-type ends 112, 114 that can be driven into the ground 110 for additional stability. In another embodiment, the ski training apparatus 100 comprises substantially flat cross braces 116, 118 disposed substantially perpendicular to and connected to the bottom of the support columns 106, 108, for additional lateral stability against forces exerted upon the support columns 106, 108 during a user's operation of the apparatus. In such an embodiment, the substantially flat cross braces 116, 118 comprise support pads 120, 122 disposed at the ends of the cross braces 116, 118, as illustrated in FIG. 1. In a further embodiment, the cross braces 116, 118 and the support pads 120, 122 disposed at the ends of the cross braces 116, 118 comprise holes 124, 126 sized to closely surround stakes 128, 130 that can be driven into the ground 110 for additional stability.

Figure 2:
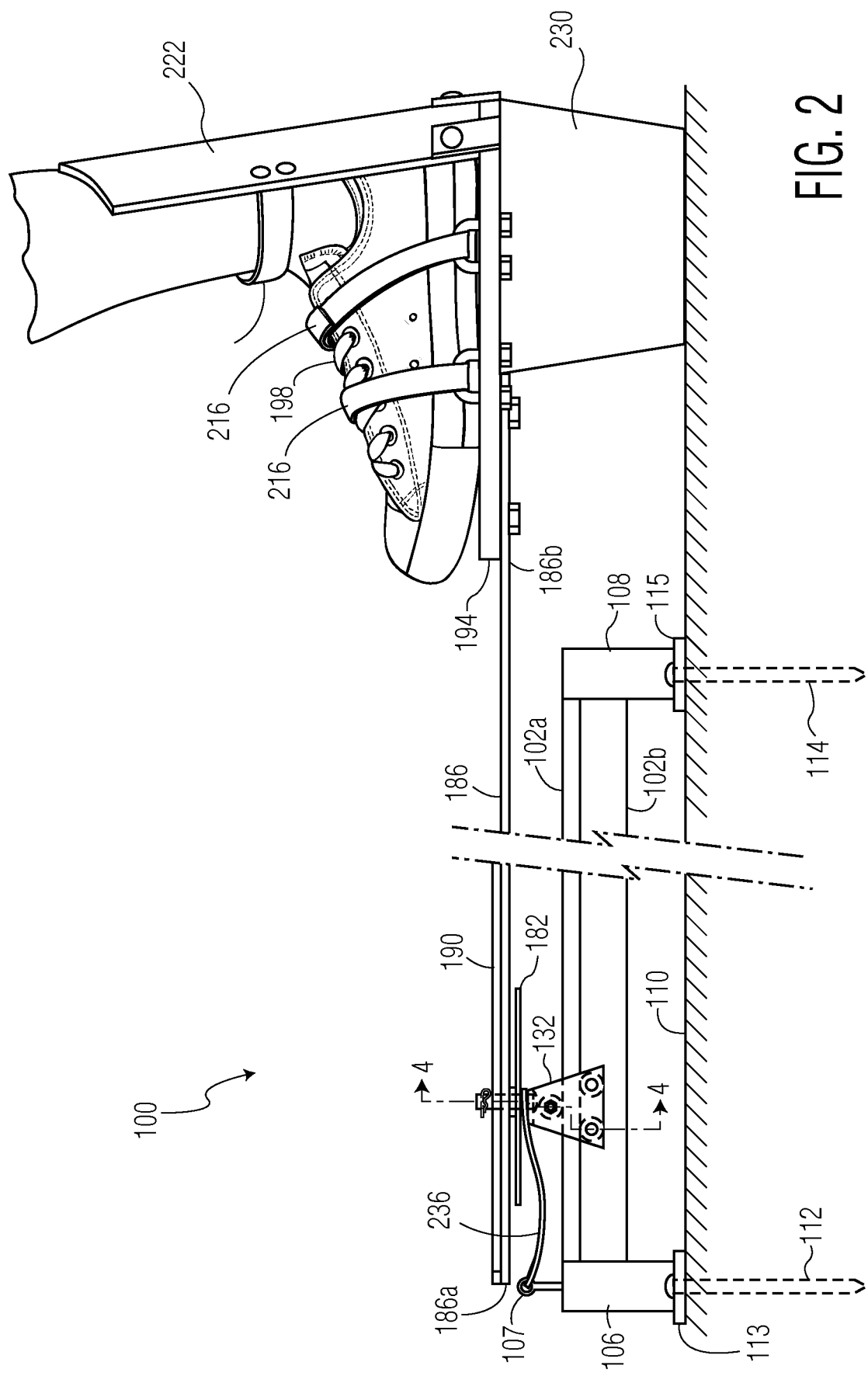
FIG. 2 illustrates a side view of an exemplary ski trainer apparatus, according to a preferred embodiment of the present invention.
Figure 3:
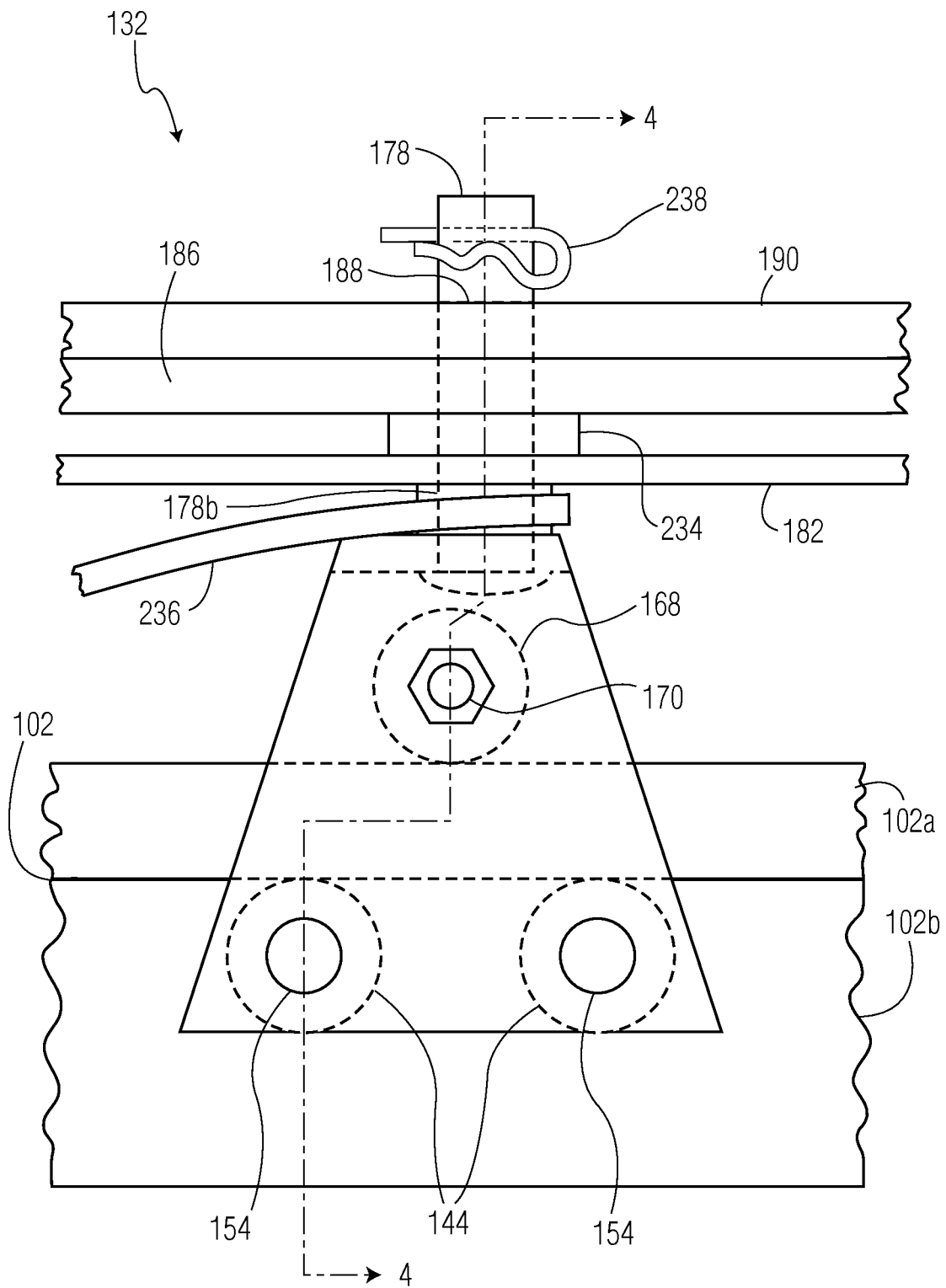
FIG. 3 illustrates an enlarged partial side view of an exemplary sliding pivot point assembly of an exemplary ski trainer apparatus, according to a preferred embodiment of the present invention.
Figure 4:
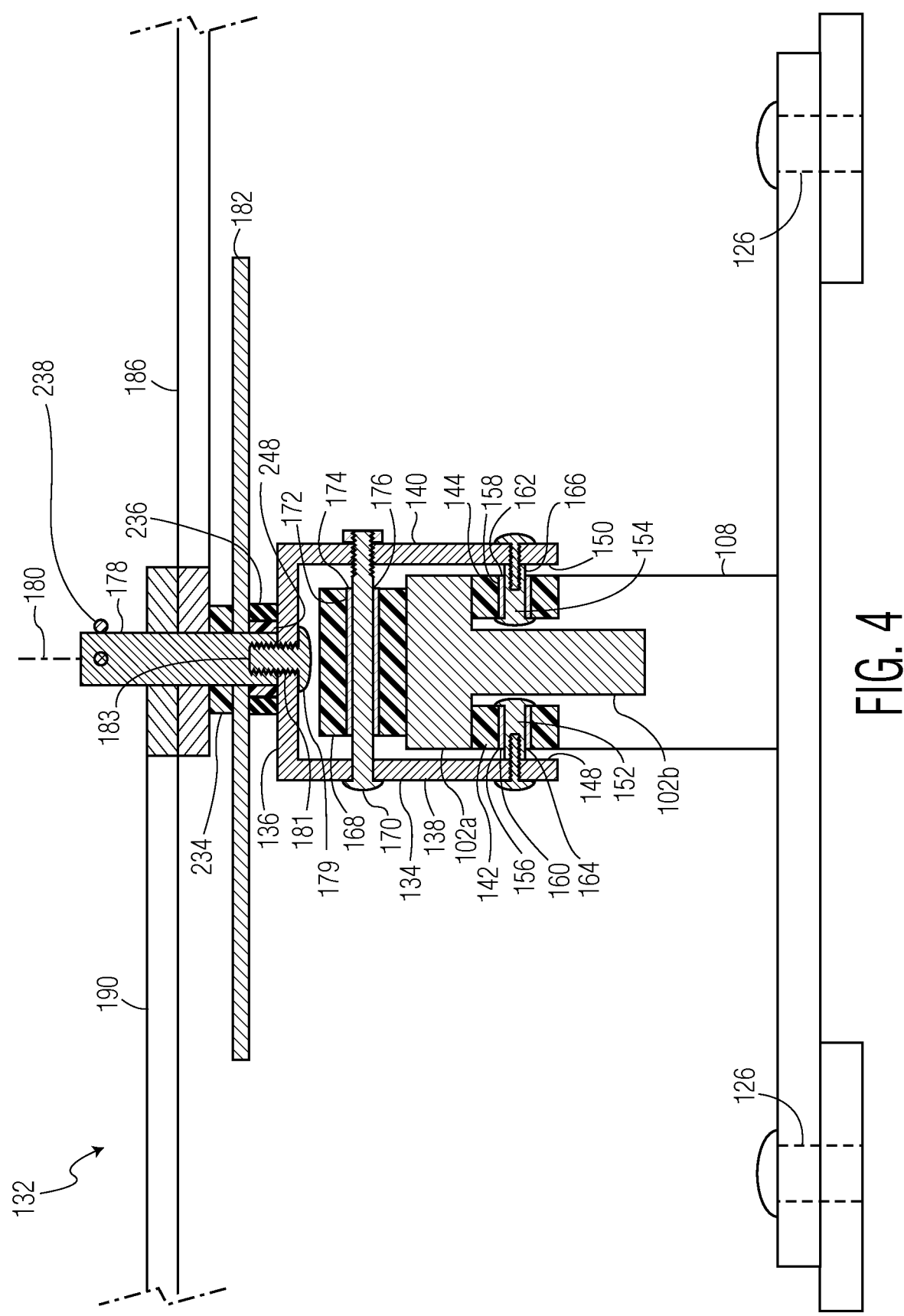
FIG. 4 is a cross sectional view along the cutting view 4-4 of FIG. 3, according to a preferred embodiment of the present invention.

As illustrated in FIGS. 1-4, the ski training apparatus 100 comprises a sliding pivot point assembly 132 operatively engaging the T-beam 102 for longitudinal movement along the length of the T-beam 102. FIGS. 2-4 illustrate that the sliding pivot point assembly 132 preferably comprises a reverse U-shaped support frame 134 having a horizontal wall 136 and downwardly extending vertical walls 138, 140 sized to closely surround the flange 102a of the T-beam 102.

As illustrated in FIG. 3 and FIG. 4, the sliding pivot point assembly 132 comprises an in line pair of roller wheels 142, 144 engaging the bottom surface of the flange 102a of the T-beam on each side 142, 144 of the web 102b of the T-beam 102 for longitudinal movement (illustrated by arrow 146 in FIG. 1) along the length of the T-beam 102. Each pair of roller wheels 142, 144 is operatively connected to the inside surface 148, 150 of one of the respective vertical walls 138, 140 of the support frame 134. FIG. 4 shows that each roller wheel of the in line pair of roller wheels 142, 144 is mounted rotating free on a spindle 152, 154 fixed to the respective vertical wall 138, 140 of the support frame 134. In a preferred embodiment, each roller wheel of the in line pair of roller wheels 142, 144 further comprises a cylindrical inner surface 156, 158 and a cylindrical bearing 160, 162 tightly fitted within the respective cylindrical inner surface 156, 158, as illustrated in FIG. 4, and each cylindrical bearing 160, 162 has a cylindrical inner working 164, 166 which is freely spinnable within the respective bearing 160, 162. Each cylindrical bearing 160, 162 and inner working 164, 166 is concentrically aligned with and sized to closely and securely surround the respective spindle 152, 154 which is fixed to the respective vertical wall 138, 140 of the support frame 134, allowing the in line pairs of roller wheels 142, 144 to freely rotate in a substantially frictionless manner.

As further illustrated in FIG. 3 and FIG. 4, the sliding pivot point assembly 132 further comprises at top roller wheel 168 engaging the top surface of the flange 102a of the T-beam 102 for longitudinal movement (illustrated by arrow 146 in FIG. 1) along the length of the T-beam 102. The top roller wheel 168 is mounted rotating free on a top spindle 170 fixed between the vertical walls 138, 140 of the support frame 134. In a preferred embodiment, the top roller wheel 168 further comprises a cylindrical inner surface 172 and a cylindrical bearing 174 tightly fitted within the cylindrical inner surface 172, as illustrated in FIG. 4, and the cylindrical bearing 174 has a cylindrical inner working 176 which is freely spinnable within the bearing 174. The cylindrical bearing 174 and inner working 176 is concentrically aligned with and sized to closely and securely surround the top spindle 170 which is fixed between the vertical walls 138, 140 of the support frame 134, to freely pivot in a substantially frictionless manner.

As further illustrated in FIG. 3 and FIG. 4, the sliding pivot point assembly 132 further comprises a vertically extending cylindrical pivot point shaft 178 fixed atop the horizontal wall 136 of the support frame 134 providing a single pivot point vertical axis 180 that is capable of longitudinal movement (illustrated by arrow 146 in FIG. 1) along the longitudinal axis of the T-beam 102.

In one embodiment, the cylindrical pivot point shaft 178 and reverse U-shaped support frame 134 are constructed as one member. In an alternative embodiment, the cylindrical pivot point shaft 178 is welded to the reverse U-shaped support frame 134. In a preferred embodiment, the lower section 178b of the cylindrical pivot point shaft 178 is connected to the reverse U-shaped support frame 134 by fasteners such as a threaded bolt 179 extending through an orifice 181 of the frame 134 and into an inner threaded portion 183 of the bottom tip of the lower section 178b of the cylindrical pivot point shaft 178 as illustrated in FIG. 4.

Preferably, the bottom tip of the lower section 106*b* of the cylindrical shaft 106 is preferably welded to the frame 104, as illustrated in FIG. 2 and FIG. 3. In an alternative embodiment, the bottom tip of the lower section 106*b* of the cylindrical shaft 106 may be connected to the frame 104 by fasteners such as a threaded bolt 116 extending through a washer 116*a* and an orifice 118 of the frame 104 and into an inner threaded portion of the bottom tip 115 of the lower section 106*b* of the cylindrical shaft 106 as illustrated in FIG. 2, whereby the exterior diameter of the cylindrical shaft 106 exceeds the diameter of the orifice 118 such that the cylindrical shaft 106 is fixed atop the frame 104 and yet secured by the threaded bolt 116.

As further illustrated in FIG. 3 and FIG. 4, preferably, the cylindrical pivot point shaft 178 has an upper section 178*a* opposite a lower section 178*b*, and the lower section 178*b* has an achievement disc 182 connected to it.

Figure 5:
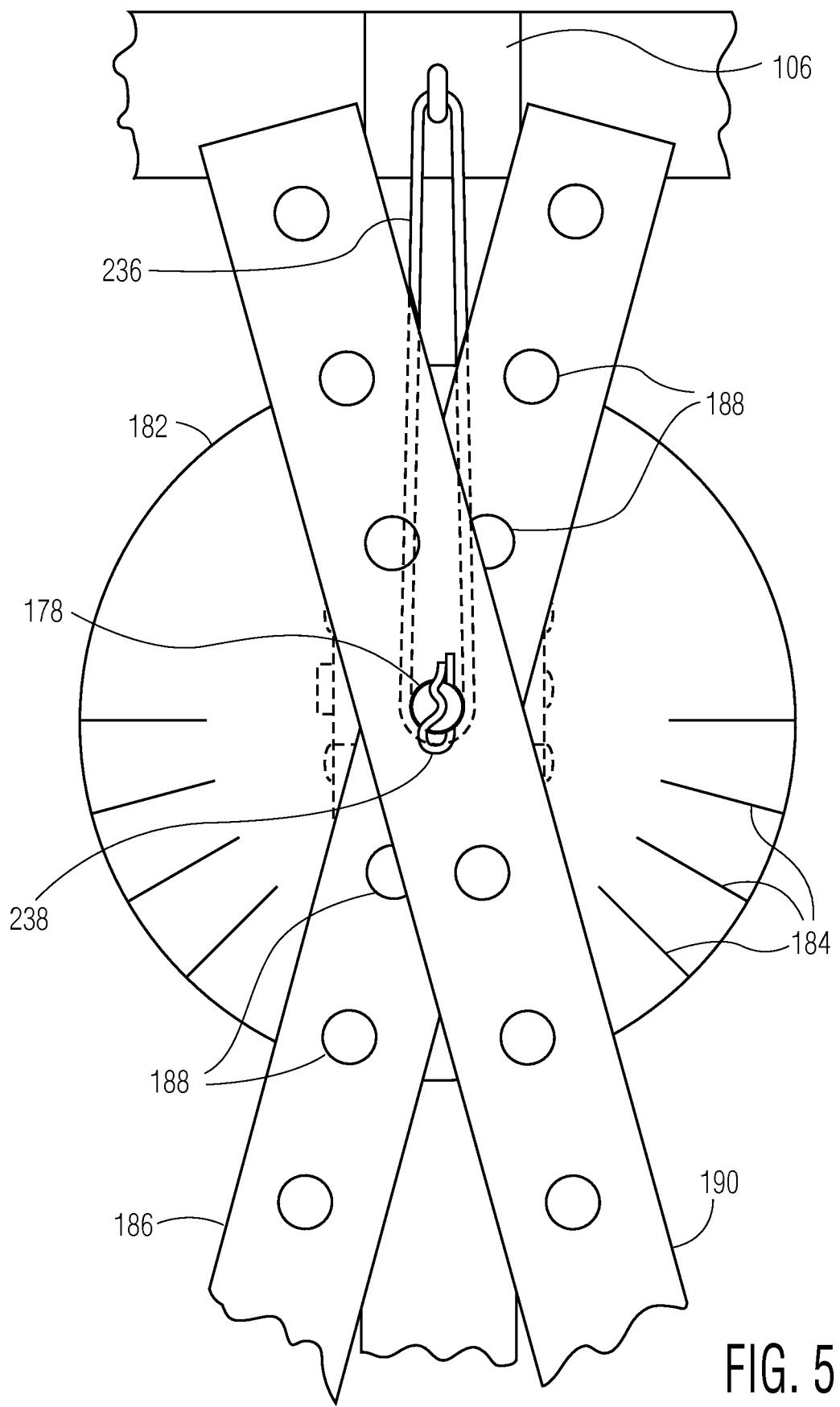
FIG. 5 illustrates an enlarged partial top view of an exemplary sliding pivot point assembly of an exemplary ski trainer apparatus, according to a preferred embodiment of the present invention.

The achievement disk 182 is aligned concentric with and is sized to closely and securely surround the lower section 178*b* of the cylindrical pivot point shaft 178. As illustrated in FIG. 5, the achievement disk 182 has a plurality of markings 184 inscribed thereon, and those markings 184 extend out radially from the point at which the achievement disc 182 intersects perpendicularly with the cylindrical pivot point shaft 178 to the outer perimeter of the achievement disc 182 for correlation between angles achieved in operation of the apparatus 100 with varying degrees of difficulty of downhill turns in assimilation of parallel snow skiing.

As illustrated in FIG. 1, the snow ski training apparatus 100 further comprises an elongated first ski arm 186 having a front end 186*a* opposite a tail end 186*b*. The first ski arm 186 is configured to pivotally mount onto the cylindrical pivot point shaft 178 by said shaft 178 vertically extending through a selected one of a plurality of holes 188 spaced along the axial length (defining longitudinal axis L1) of the first ski arm 186, allowing the first ski arm 186 to freely pivot independently around the vertical axis 180 of the cylindrical pivot point shaft 178.

As illustrated in FIG. 1, the snow ski training apparatus 100 further comprises an elongated second ski arm 190 disposed unparallel to the first ski arm 186 having a front end 190*a* opposite a tail end 190*b*. The second ski arm 190 is configured to pivotally mount onto the cylindrical pivot point shaft 178 by said shaft 178 vertically extending through a selected one of a plurality of holes 192 spaced along the axial length (defining longitudinal axis L2) of the second ski arm 190, allowing the second ski arm 190 to freely pivot independently around the same vertical axis 180 of the cylindrical pivot point shaft 178 as the first ski arm 186.

FIG. 3 illustrates that a cotter pin 238 is preferably configured through the top section 178*a* of the cylindrical pivot point shaft 178, so as to provide resistance against unintended uplift and resulting removal of the ski arms 186, 190 from the cylindrical pivot point shaft 178.

As illustrated in FIGS. 1-2 and FIGS. 6-20, the snow ski training apparatus 100 comprises a first foot pad 194 selectively connected to the tail end 186*b* of the first ski arm 186, and the snow ski training apparatus 100 further comprises a second foot pad 196 selectively connected to the tail end 190*b* of the second ski arm 190. The first foot pad 194 is configured to receive a first foot 198 of a user, and the second foot pad 196 is configured to receive a second foot 199 of a user, as illustrated in FIG. 2, FIG. 6, and FIGS. 13-20.

As illustrated in FIG. 1, the elongated ski arms 186, 190 are not parallel. One reason that the ski arms 186, 190 are not parallel is because such embodiment of the present invention enables longitudinal axes L1, L2 of the ski arms 186, 190 to cross and overlap at a single pivot point 178, and thereby enables the foot pads 194, 196 to rotate about the same pivot point axis 180, and thus enables the foot pads 194, 196 of the ski training apparatus 100 to rotate along the same, congruent and overlapping arc 200. In teaching and training a user in the art of parallel snow skiing, embodiments of the present invention more closely represent actual snow skiing.

Figure 11:
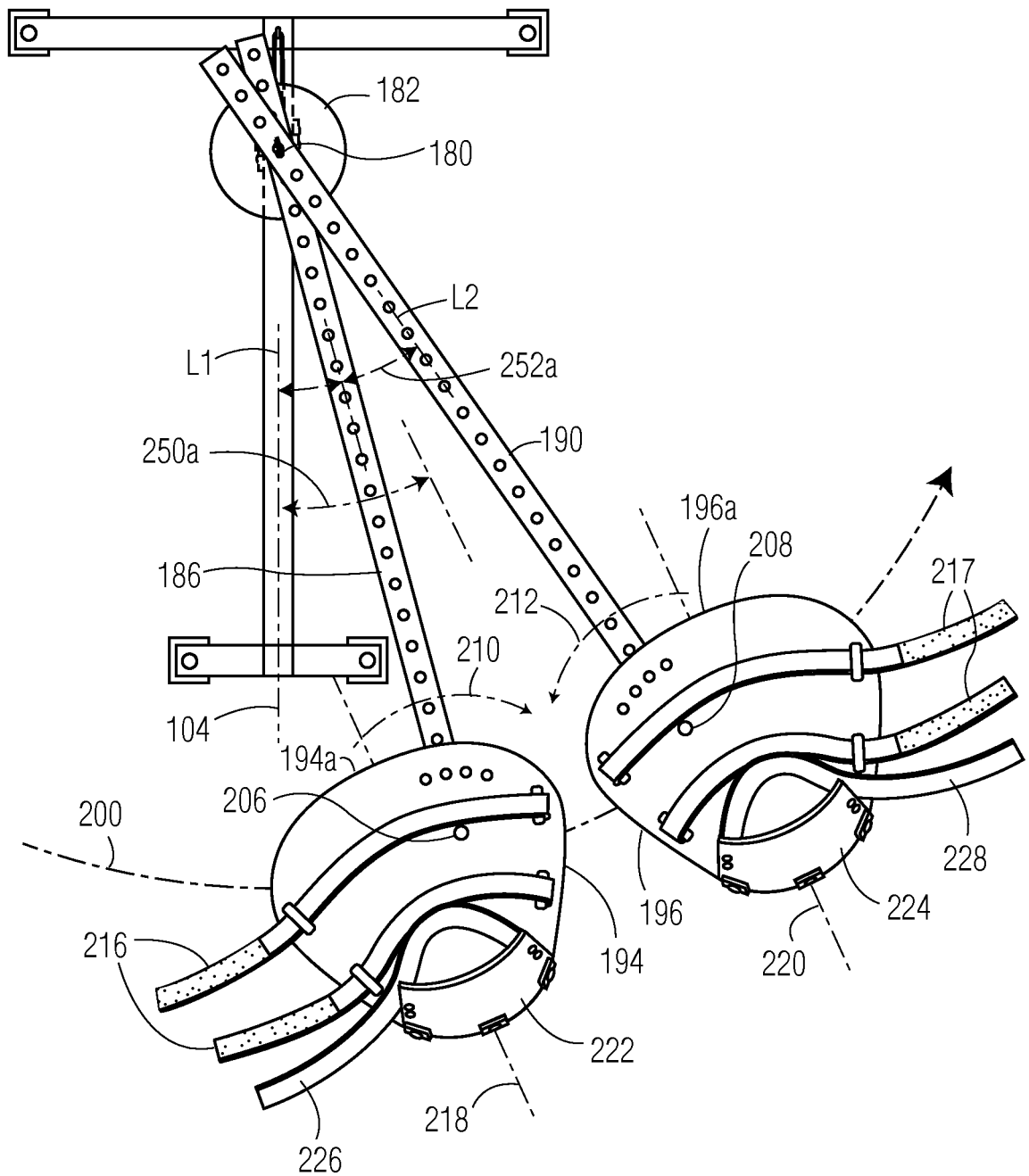
FIG. 11 illustrates a top view of an exemplary ski training apparatus, according to a preferred embodiment of the present invention.

In a preferred embodiment, there is an array of spaced apart positioning holes 202, 204 arranged along on the toe end 194*a*, 196*a* of each of the foot pads 194, 196 selectively in line with a corresponding mounting hole 206, 208 disposed within each respective foot pad 194, 196 in a manner such that each foot pad 194, 196 may be selectively mounted to the respective ski arm 186, 190 at any selected position along the same arc 210, 212, respective to each foot pad 194, 196, as illustrated in FIG. 11.

Figure 7:
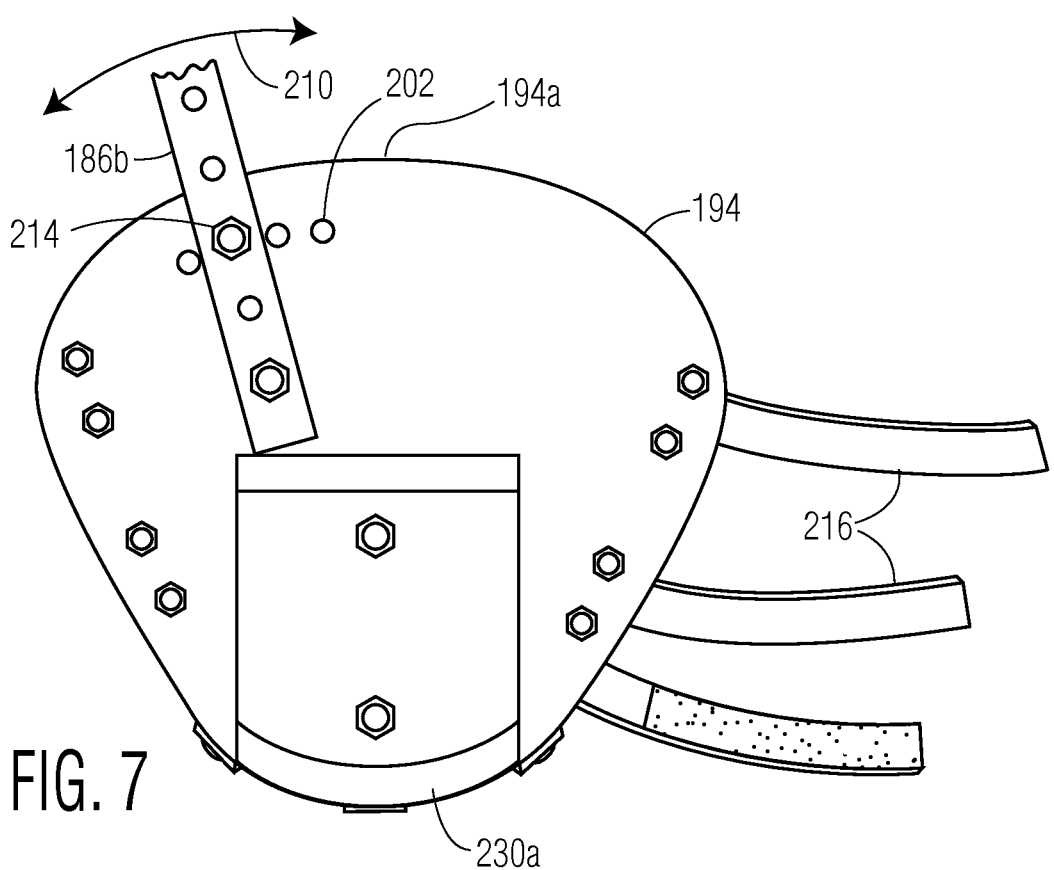
FIG. 7 illustrates a bottom view of an exemplary foot pad connected to a tail end of a ski arm and connected to an exemplary landing base pad, according to a preferred embodiment of the present invention.
Figure 8:
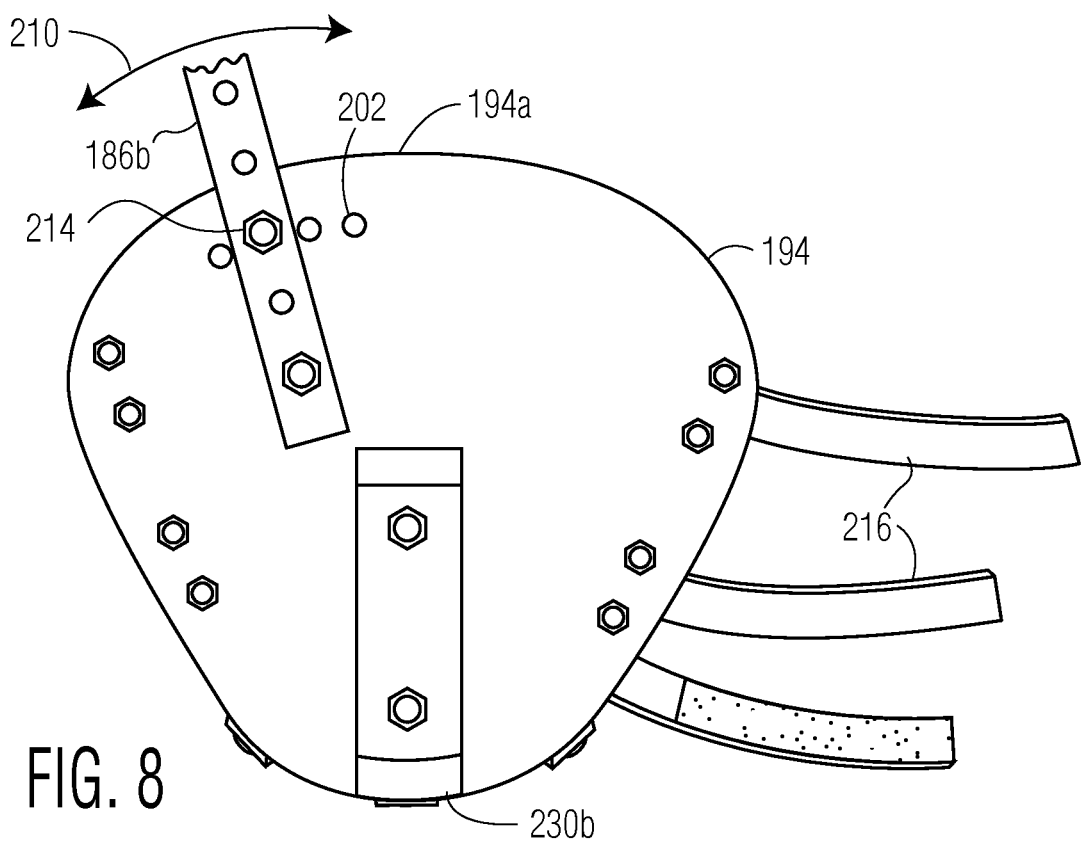
FIG. 8 illustrates a bottom view of an exemplary foot pad connected to a tail end of a ski arm and connected to another exemplary landing base pad, according to a preferred embodiment of the present invention.

As illustrated in FIGS. 7-8, the selected connection for the first foot pad 194 is a fixed position with respect to the first ski arm 186, configured by a bolt 214 vertically extending through at least one of the holes 188 disposed at the tail end 186*b* of the first ski arm 186 and vertically extending into a selected one of a plurality of holes 202 disposed within the first foot pad 194, where such holes 202 are configured to receive the bolt 214 so as to connect and position the foot pad 194 relative to the tail end 186*b* of the ski arm 186.

Figure 6:
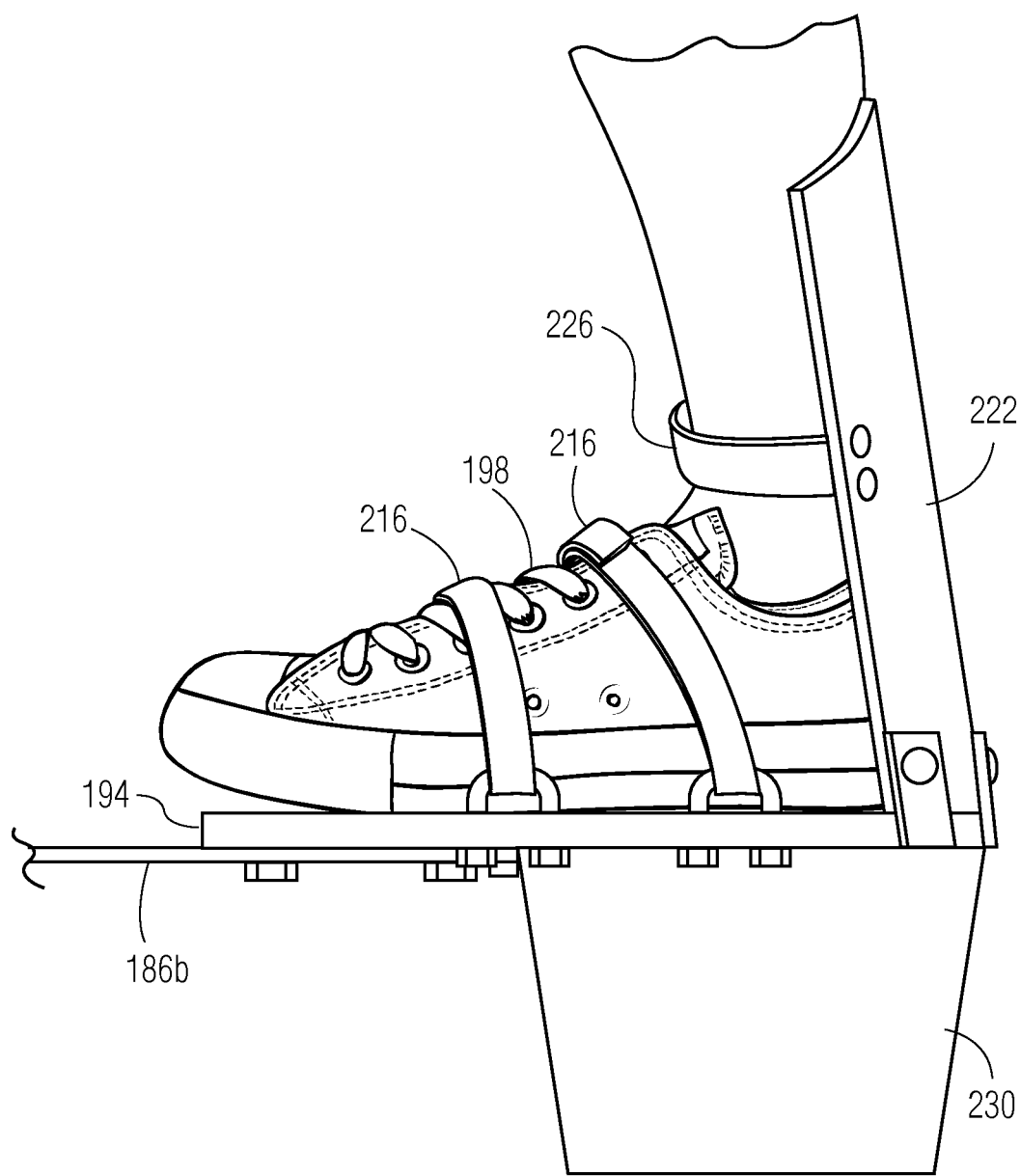
FIG. 6 illustrates an enlarged partial side view of an exemplary foot of a user engaged with a foot pad of a ski training apparatus, according to a preferred embodiment of the present invention.
Figure 9:
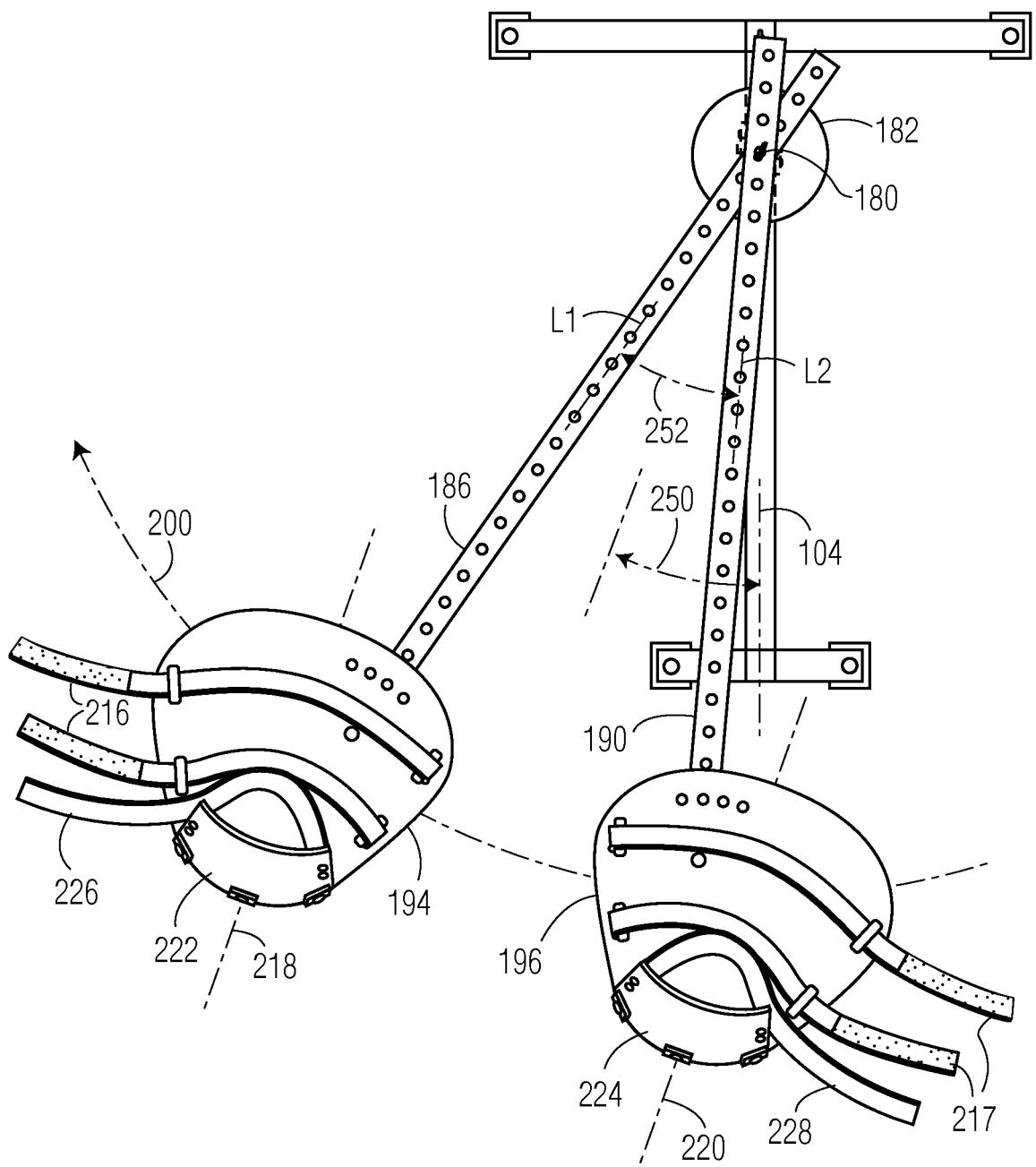
FIG. 9 illustrates a top view of an exemplary ski training apparatus, according to a preferred embodiment of the present invention.

As illustrated in FIG. 6 and FIG. 9, in a preferred embodiment, each of the foot pads 194, 196 has laces 216, 217 mounted to the respective foot pad 194, 196 in a spaced apart relationship on opposite sides of the longitudinal axis 218, 220 of the respective foot pad 194, 196. The laces 216, 217 are configured to hold the two feet 198, 199 of the associated user of the exercise apparatus 100 in a substantially fixed relationship relative to the respective foot pad 194, 196 when using the ski training apparatus 100.

Some previous ski inventions require multiple pivot points including a pivot point directly under the center of the foot requiring expensive complexities of construction and others have two foot pedals directly connected, allowing for no independent action. Embodiments of the present invention have more improved duplication of actual snow skiing and are improvements over previous devices because the true pivot point for turning is established at a single pivot point 180 embodiment for both pivoting ski arms 186, 190 operating independently and because the single pivot point 180 embodiment longitudinally moves backward and forward enabling the user's body and feet to actually move backward and forward through the user's frontal (or coronal) plane, while also radially guiding and maintaining both of the user's feet within the same overlapping arc 200.

In one embodiment, the two ski arms 186, 190 having a single pivot point 180 forces each independently and tangentially moved foot 198, 199 of the user to remain within the same overlapping arc 200 as the other independently and tangentially moved foot 198, 199 of the user, as illustrated in FIG. 1 and FIGS. 9-11. Embodiments of the present invention provide improved techniques to closely teach and represent actual snow skiing.

Similarly to actual snow skiis, the overall length of each ski arm 186, 190 is preferably selectively sized depending on the height and weight of the user.

The pivot point assembly 178 provides a means for accommodating the tangential and radial forces exerted upon the ski training apparatus 100 by sliding back and forwards along the T-beam 102 while a user laterally jumps and rotationally pivots around the pivot point assembly 178, as illustrated in FIGS. 15-20.

Figure 13:
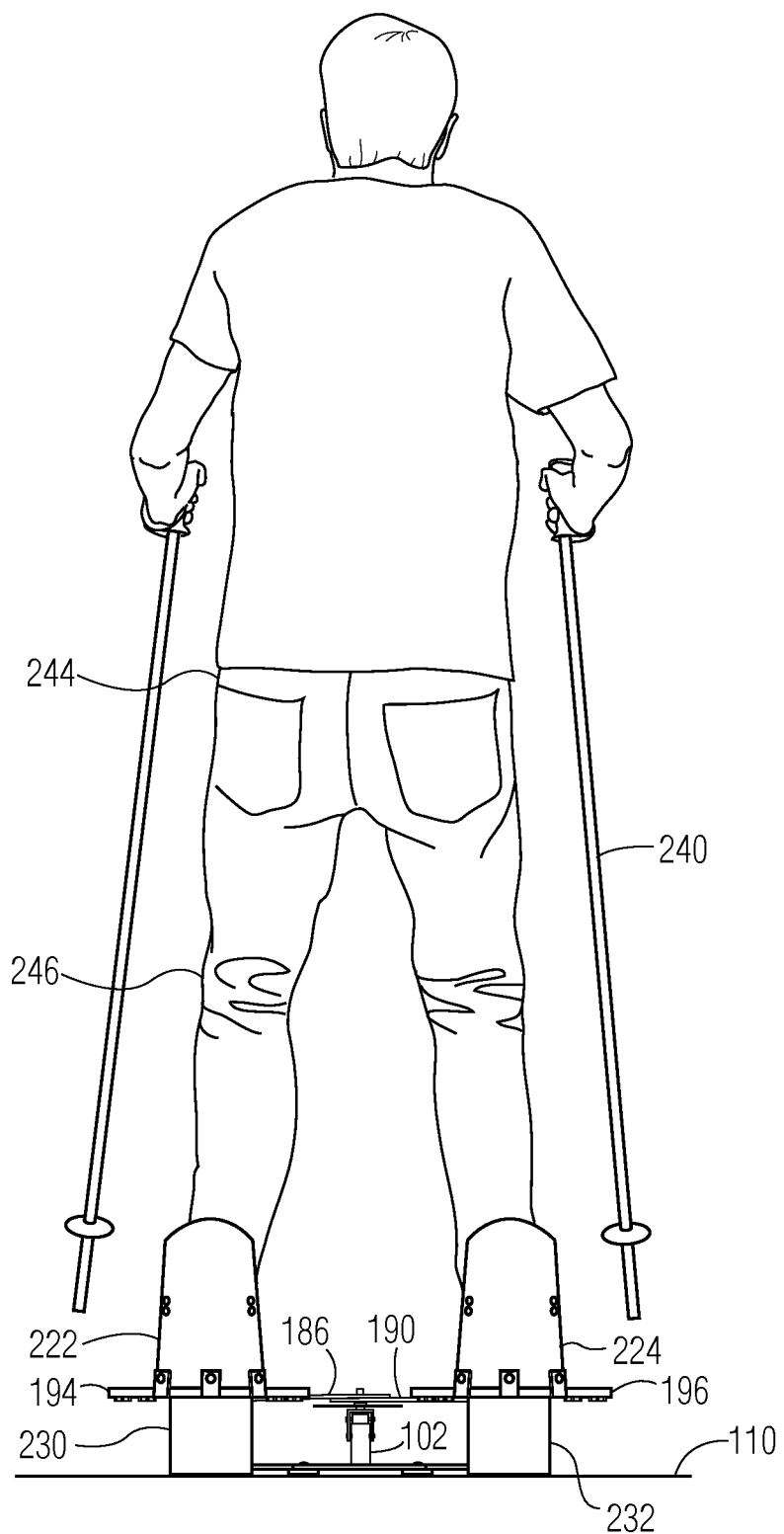
FIG. 13 illustrates a back view of an exemplary ski training apparatus, according to a preferred embodiment of the present invention, and illustrated with a user.

As illustrated in FIGS. 7, 8 and 13, in a preferred embodiment, each of the foot pads 194, 196 has landing base pads 230, 232 mounted to the respective foot pads 194, 196. FIG. 7 and FIG. 8 illustrate that the landing base pads 230, 232 are interchangeably configured at varying widths, where 230a in FIG. 7 illustrates an exemplary relatively wide landing base pad 230, and 230b in FIG. 8 illustrates an exemplary relatively narrow landing base pad 230.

The bottom surface of the landing base pads 230, 232 is a flat substantially planar surface configured to rest stably on an associated ground 110. The toe end and heel end of the landing base pads 230, 232 preferably arch upwardly axially in relation to the respective foot pads 194, 196 as illustrated in FIGS. 2, 6-8, and 15. In one embodiment, for the landing base pads 230, 232, rubber cushions may be used, or a flat interface of rubber or any other resilient material may be provided on the bottom surface of the landing base pads 230, 232, to help support and balance the landing base pads 230, 232 and respective foot pads 194, 196 relative to the ground during use of the ski training apparatus 100.

Preferred embodiments of the present invention provide a ski training apparatus 100 that not only isolates the movement of each ski arm 186, 190 from the respective other 186, 190 during the course of operating the apparatus 100 but also absorbs impact and shock loads that can be experienced during a person's acceleration and stopping of a user's feet, particularly in jumping. Since impact and shock loads can be experienced during landings due to gravity as, for example, the user jumps from side to side, the landing base pads 230, 232 help absorb and dampen the loads and thus soften the operation for the user. The ski training apparatus 100 of embodiments of the invention is preferably created by its combining flexible ski arms 186, 190, connected to a single frontal sliding pivot connection 180, with flexible rubber shock absorber base pads 230, 232 in an assembly resulting in a single apparatus 100 that has relative rigidity for teaching guided jumping but is also flexible and compliant to absorb impacts.

FIGS. 1-4, 11 and 12 illustrate that an elastic band 236 is securely laced around the lower section 178b (in FIG. 3.) of the cylindrical pivot point shaft 178.

In one embodiment, one end of the elastic band 236 is connected to the eye-bolt 107 positioned atop the front column 106. The other end of the elastic band 236 is securely laced around the cylindrical pivot point shaft 178. The elastic band 236 repositions the sliding pivot point assembly 132 during training and operation of the ski training apparatus 100 by the user.

In a preferred embodiment, the other end of the elastic band 236 is securely laced around an encasing which surrounds the cylindrical pivot point shaft 178, preferably such encasing being a compression bushing 248 (FIG. 4) that is positioned concentric with and closely surrounds the lower section 178b (FIG. 3) of the cylindrical pivot point shaft 178 near the base 178b of the shaft 178. Such bushing 248 (FIG. 4) would reduce wear and tear of the elastic band 236. The bushing 248 is preferably positioned above the horizontal surface 136 of the support frame 134 and below the cylindrical performance achievement disc 182 of the sliding pivot point assembly 132 such that the elastic band 236 wrapping the bushing 248 is confined by yet freely pivotable (less side-rubbing against vertical cylindrical pivot point shaft 178) between the performance achievement disc 182 and the horizontal surface 136 of the sliding pivot point assembly 132. The bushing 248 could also serve to allowing free pivoting between the elastic band 236 and the vertical cylindrical shaft 178 while enabling suspension of the performance achievement disc 182 (in the circumstance that the performance achievement disc is not securely fastened or welded to the cylindrical pivot point shaft 178) and also obviating pinching of the elastic band 236 between the performance achievement disc 182 and the horizontal surface 136 of the sliding pivot point assembly 132, thereby greatly lessening wear and tear of the elastic band 236. Such embodiments of the present invention thereby mitigate nearly any torsional forces otherwise incidentally effected or imposed upon the cylindrical pivot point shaft 178 by the elastic band 236, further facilitating unidirectional axial forces effectuated by the elastic band 236, when a user operates the ski training apparatus 100.

In one embodiment, a cylindrical bushing 234 is concentrically aligned with and sized to closely and securely surround the cylindrical pivot point shaft 178 of the sliding pivot point assembly 132, said bushing 234 is vertically disposed between the performance achievement disc 182 and the first ski arm 186. Such embodiments of the present invention thereby mitigate radial and tangential forces exerted upon the cylindrical pivot point shaft 178 of the sliding pivot point assembly 132 by providing shock absorption and cushioning between the performance achievement disc 182 and the first ski arm 186.

Embodiments of the present invention provide for new methods for teaching and training the art of parallel snow skiing, through an embodied use of unparallel ski arms as described herein and illustrated in the Figures. Preferred methods of using the ski training apparatus embodiments of the present invention are illustrated in FIGS. 13-20. The first step of operation of the method is providing the snow ski training apparatus 100 having two elongated freely rotatable overlapping ski arms 186, 190 pivotally mounted to a single vertical cylindrical pivot point shaft 178 fixed at the point of overlap on a sliding pivotal point assembly 132. The sliding pivot point assembly 132 is configured for movement along a longitudinal axis of a supporting T-beam 102. Each ski arm 186, 190 has a foot pad 194, 196 connected to a heel rest 222, 224 resting on the ground 110 with laces 216, 217 configured on each foot pad 194, 196 and laces 226, 228 configured on each heel rest 222, 224 to receive a respective foot 198, 199 of a user at the tail end 186b, 190b of each respective ski arm 186, 190. The foot pads 194, 196 and respective feet 198, 199 of a user are preferably aligned depending on the skill level of the user. Embodiments of the present invention enable a novice user to align the foot pads 194, 196 in a slightly pigeon toed direction, analogous to the wedge technique often utilized by a novice skier during actual snow skiing. In addition, embodiments of the present invention enable an expert user to align the foot pads 194, 196 in parallel, analogous to the parallel technique often utilized by an expert skier during actual parallel snow skiing.

FIG. 13 illustrates a user standing substantially upright, supporting a substantial entirety of the user's body weight, with his left foot 198 placed atop the first foot pad 194, and his right foot placed atop the second foot pad 196. FIG. 13 illustrates the landing base pad 230, 232 secured to the bottom of each respective foot pad 194, 196, to provide additional stability and cushioning effects for the user, as a preferred embodiment. The user's feet are in alignment with the respective foot pads 194, 196 positioned on the ground. The heels of the user's feet each engage the connected heel rests 222, 224 of each respective foot pad 194, 196. Each foot 198, 199 of the user is securely laced 216, 217 to the respective foot pad 194, 196 and respective heel rest 222, 224, as illustrated in FIGS. 1, 6, 19, and 13.

Figure 14:
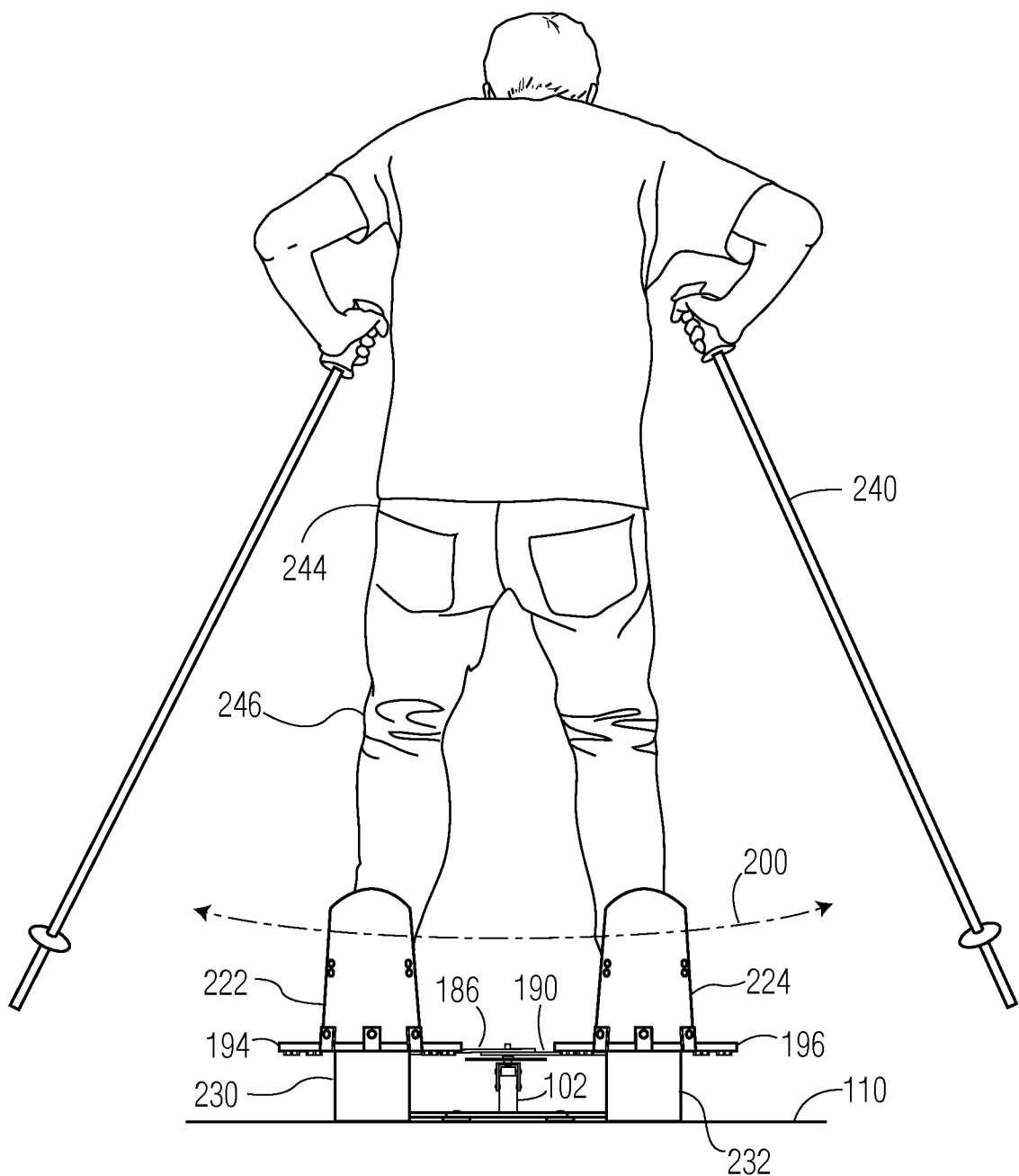
FIG. 14 illustrates a back view of an exemplary ski training apparatus, according to a preferred embodiment of the present invention, and illustrated with a user.

FIG. 14 illustrates the user of FIG. 13 assuming a hip flexed position, where the hip 244 of the user in FIG. 14 is below the height of the hip 244 of the user in the standing substantially upright position in FIG. 13. As FIG. 14 illustrates the user of FIG. 13 assuming a hip flexed position, preferably, the hip-femur 244 angle of the user approaches about 90 degrees and the bend angle of a user's knees 246 approaches about 90 degrees.

Figure 15:
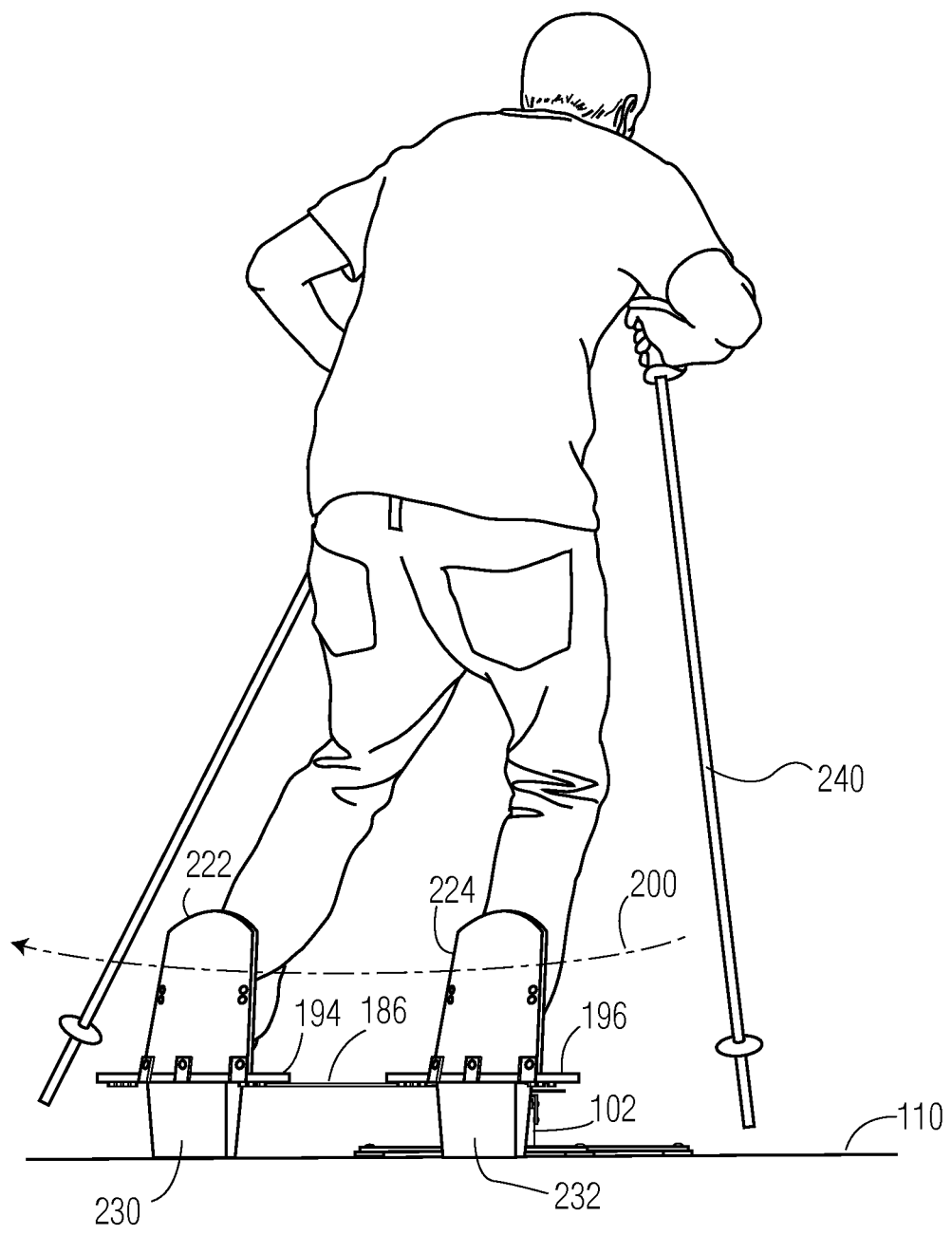
FIG. 15 illustrates a back view of an exemplary ski training apparatus, according to a preferred embodiment of the present invention, and illustrated with a user.
Figure 16:
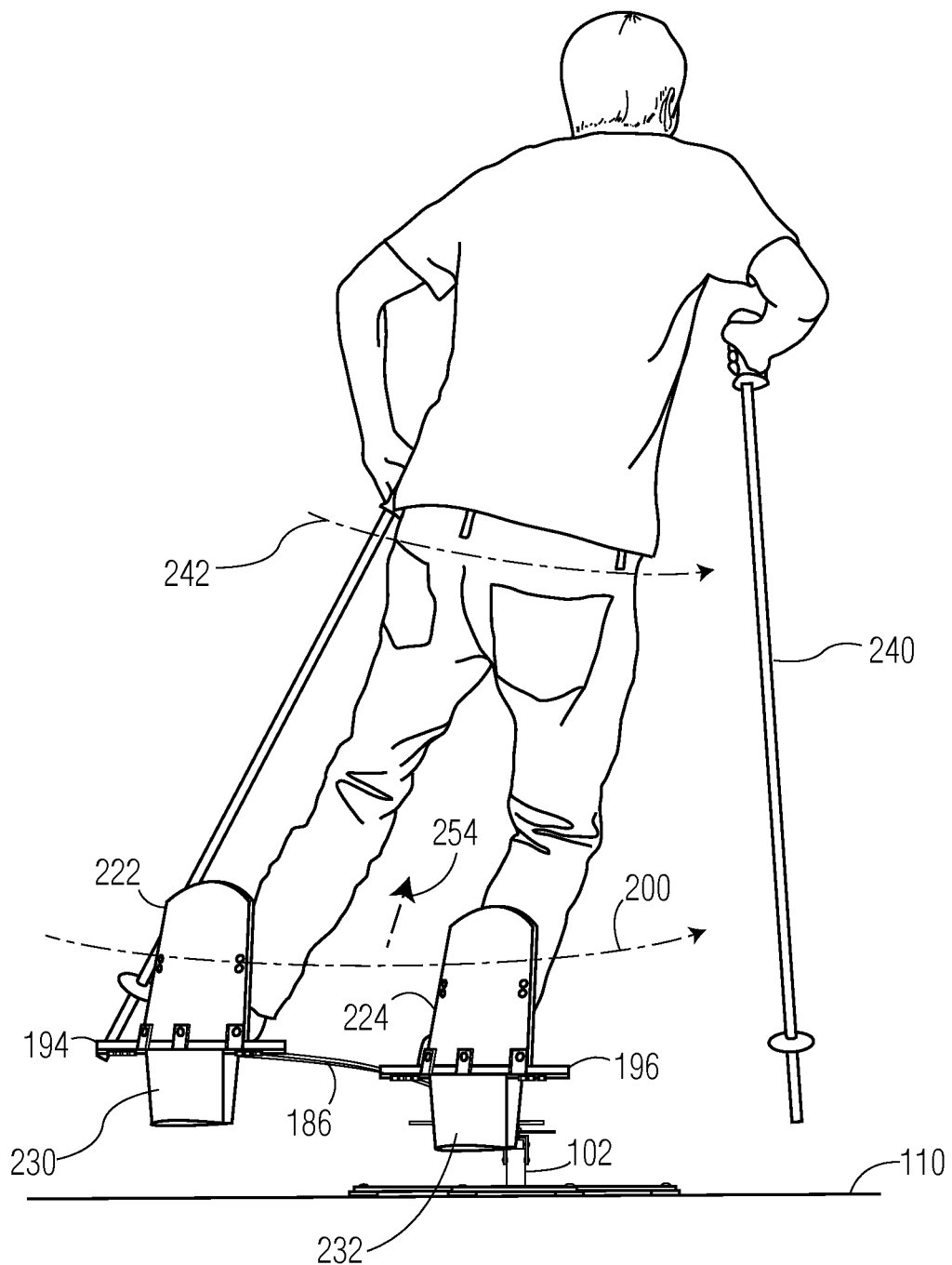
FIG. 16 illustrates a back view of an exemplary ski training apparatus, according to a preferred embodiment of the present invention, and illustrated with a user.
Figure 17:
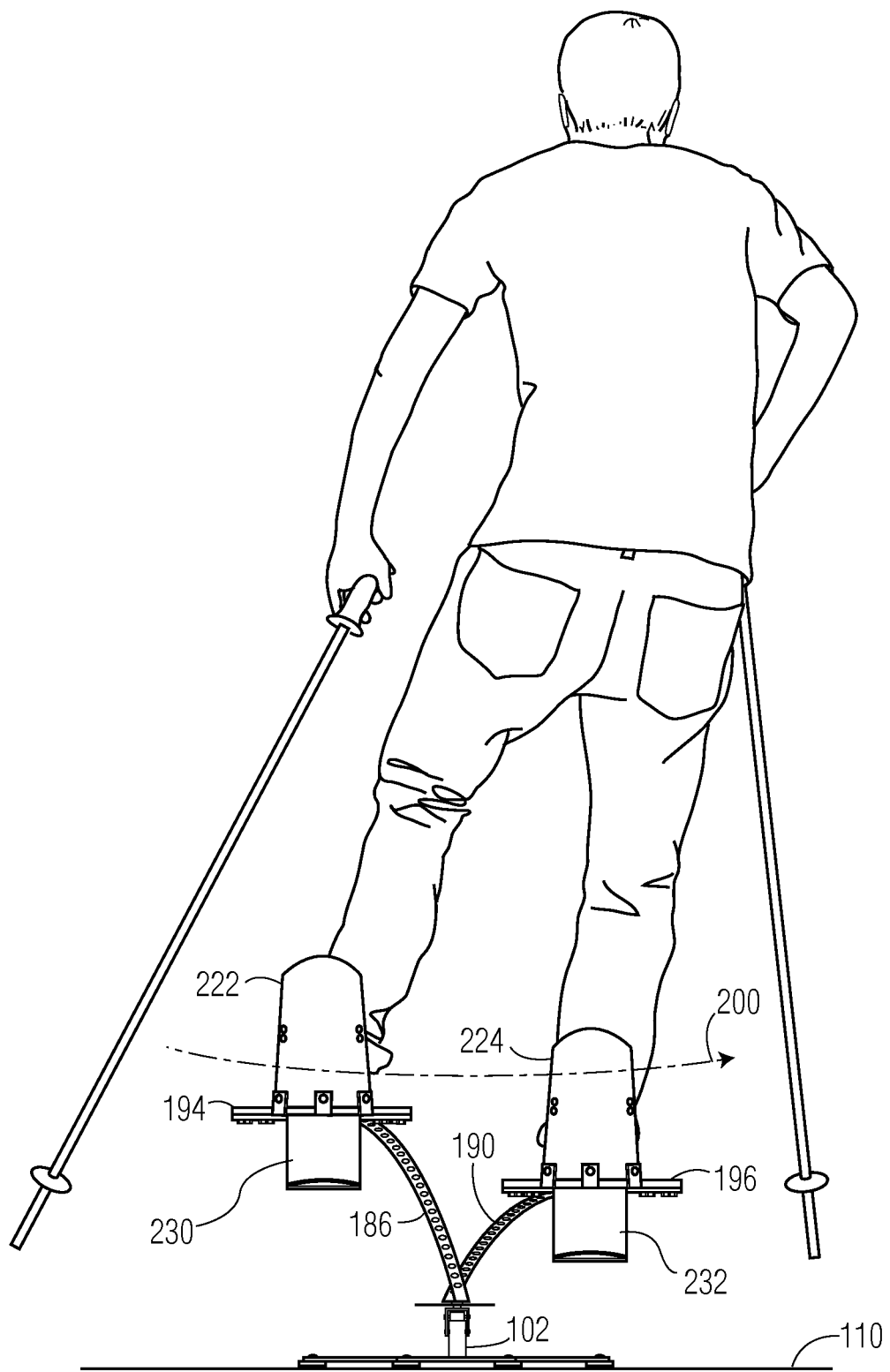
FIG. 17 illustrates a back view of an exemplary ski training apparatus, according to a preferred embodiment of the present invention, and illustrated with a user.

FIG. 15 illustrates the user leaning the user's body laterally through the user's sagittal plane. For purposes of illustration, FIG. 9 illustrates a top view of the ski arms 186, 190 rotated at approximately 30 degrees 250 off of 104, in a manner approximately similar to FIG. 15. FIG. 16 illustrates the user extending his hip 244 and knees 246 until the user achieves an elevated position (represented by arrow 254). While in the elevated position 254, the substantial entirety of the user's body weight is not being vertically supported by either foot pad 194, 196, as the foot pads 194, 196 and respective feet 198, 199 of the user are vertically free floatingly elevated 254 above the ground without load bearing support. FIG. 15 further illustrates the user rotating the user's torso as illustrated by arrow 242, as the user laterally maneuvers. FIG. 16 to FIG. 17 illustrates the user laterally maneuvering the user's body from a first position to a second position through the user's sagittal plane while in the elevated position 254. The arc arrow 200 in FIG. 17 illustrates that the foot pads 194, 196 tangentially move along the same, congruent and overlapping arc 200, according to embodiments of the present invention. In a preferred embodiment, the user's feet 198, 199 remain parallel.

FIG. 17 further illustrates that embodiments of the present invention enable the foot pads 194, 196 and user's respective feet 198, 199 to maneuver at varying and differing elevations, as the user laterally maneuvers along arc 200.

Figure 18:
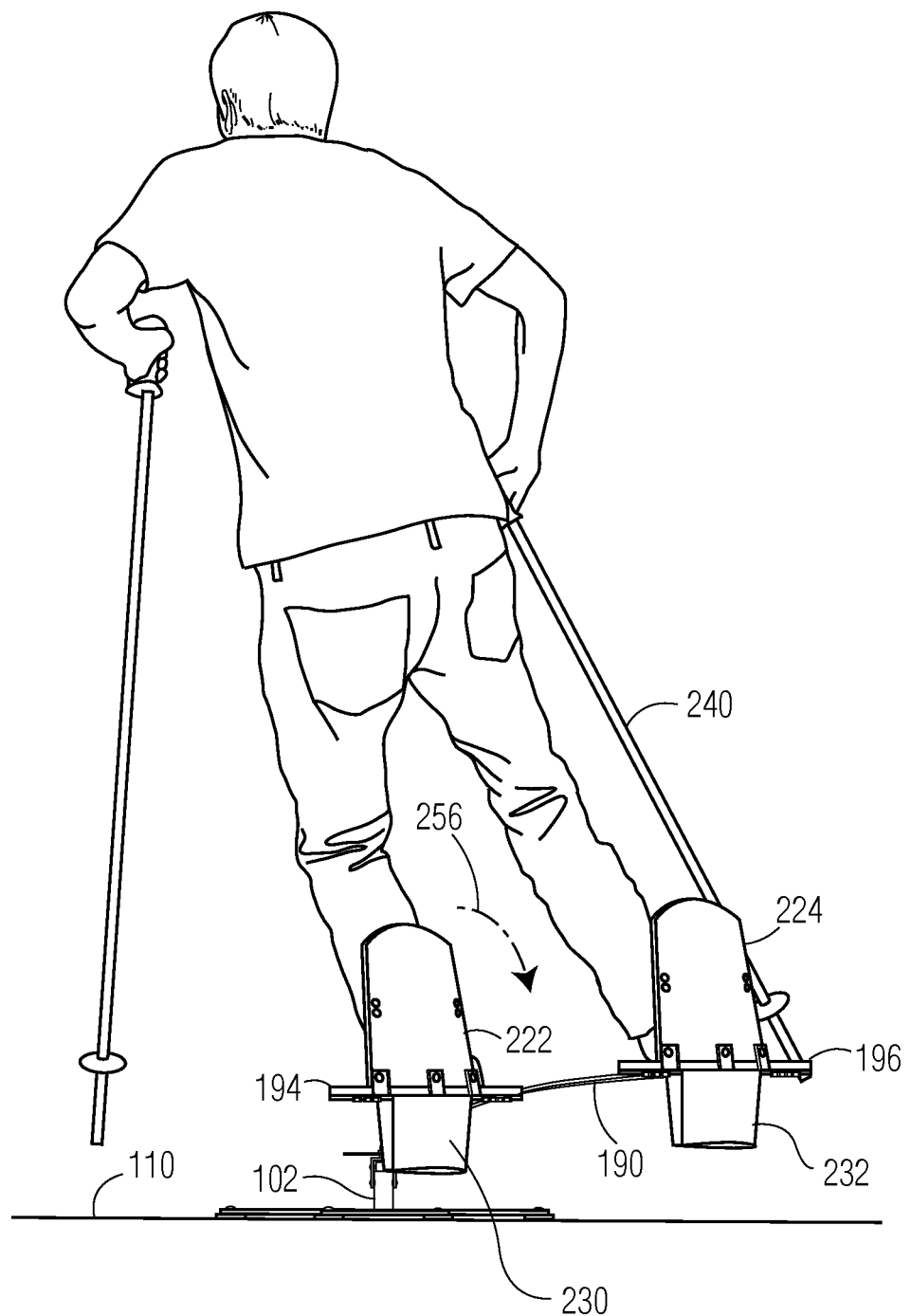
FIG. 18 illustrates a back view of an exemplary ski training apparatus, according to a preferred embodiment of the present invention, and illustrated with a user.
Figure 19:
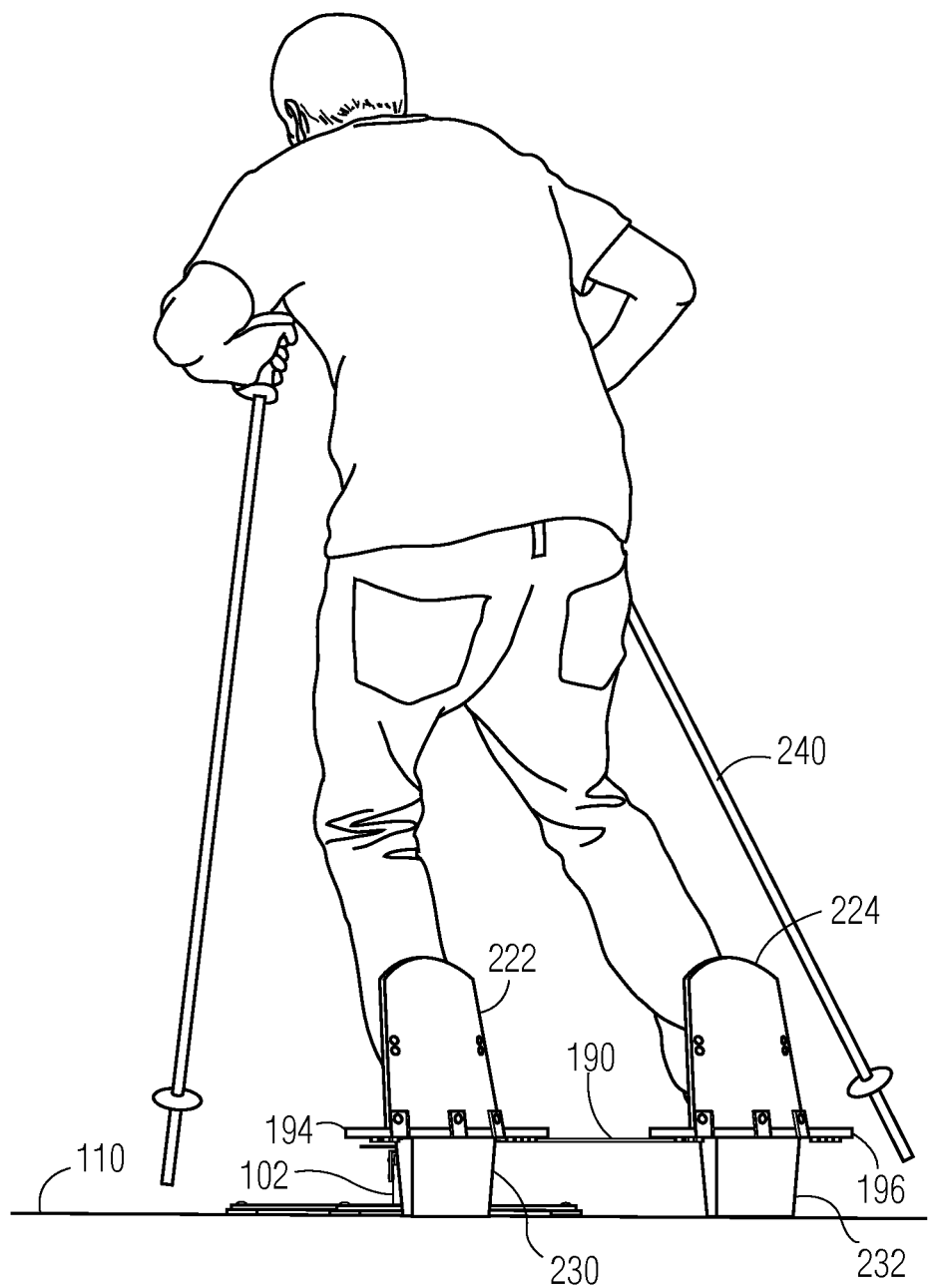
FIG. 19 illustrates a back view of an exemplary ski training apparatus, according to a preferred embodiment of the present invention, and illustrated with a user.

FIG. 18 illustrates the user descending (as illustrated by downward arrow 256) and FIG. 19 illustrates the user returning to a hip flexed position, preferably nearly opposite the initial hip flexed position illustrated in FIG. 15, after the step of laterally maneuvering the user's body. For purposes of illustration, FIG. 10 illustrates the ski arms 186, 190 rotated at approximately 30 degrees 250 off of 104, in a manner approximately similar to FIG. 19.

In a preferred embodiment of the present invention, the user initially selectively places the foot pad 194 for his/her left foot 198 substantially parallel to the foot pad 196 for his/her left foot 199 while positioned on the ground further includes aligning the right foot pad in parallel with the left foot pad, such that the longitudinal axis 218 of the foot pad 194 is parallel to the longitudinal axis 220 of the foot pad 196, as illustrated in FIG. 1 and FIGS. 9-12.

Figure 10:
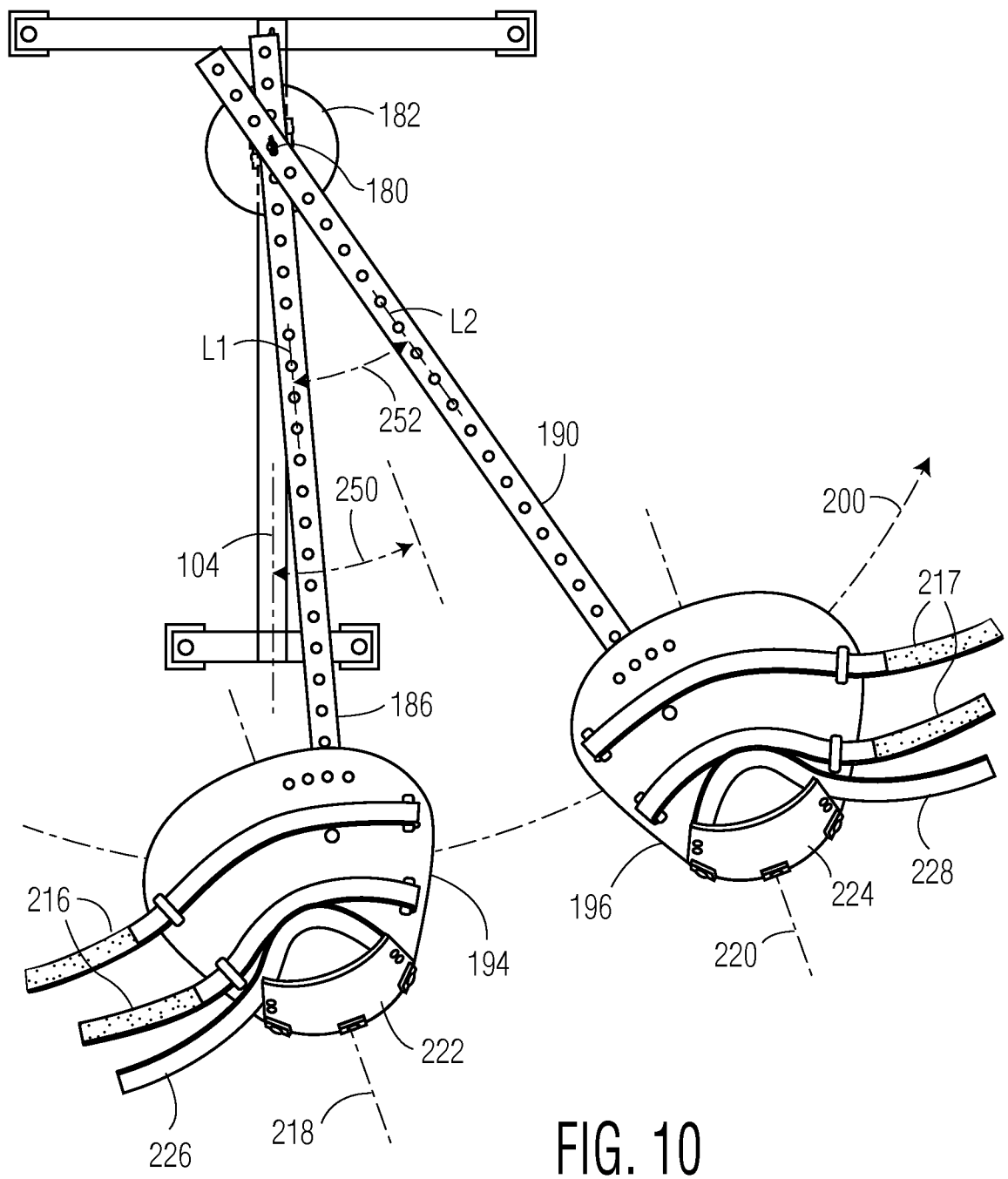
FIG. 10 illustrates a top view of an exemplary ski training apparatus, according to a preferred embodiment of the present invention.

FIG. 10 and FIG. 11 illustrate embodiments of the present invention enable the longitudinal axis 218 of foot pad 194 to be selectively positioned in parallel with the longitudinal axis 220 of foot pad 196, while the approximately 30 degree angle of arc 252 (FIG. 10) between the unparallel ski arms 186, 190 differs from the approximately 20 degree angle of arc 252a (FIG. 11) between the unparallel ski arms 186, 190.

Embodiments of the present invention further comprise a step of a user radially moving the user's body from a first position to a second position through the user's frontal plane while pivoting around the single pivot point axis 180 engaging the unparallel ski arms 186, 190 mounted on the sliding pivot point assembly 132.

Figure 12:
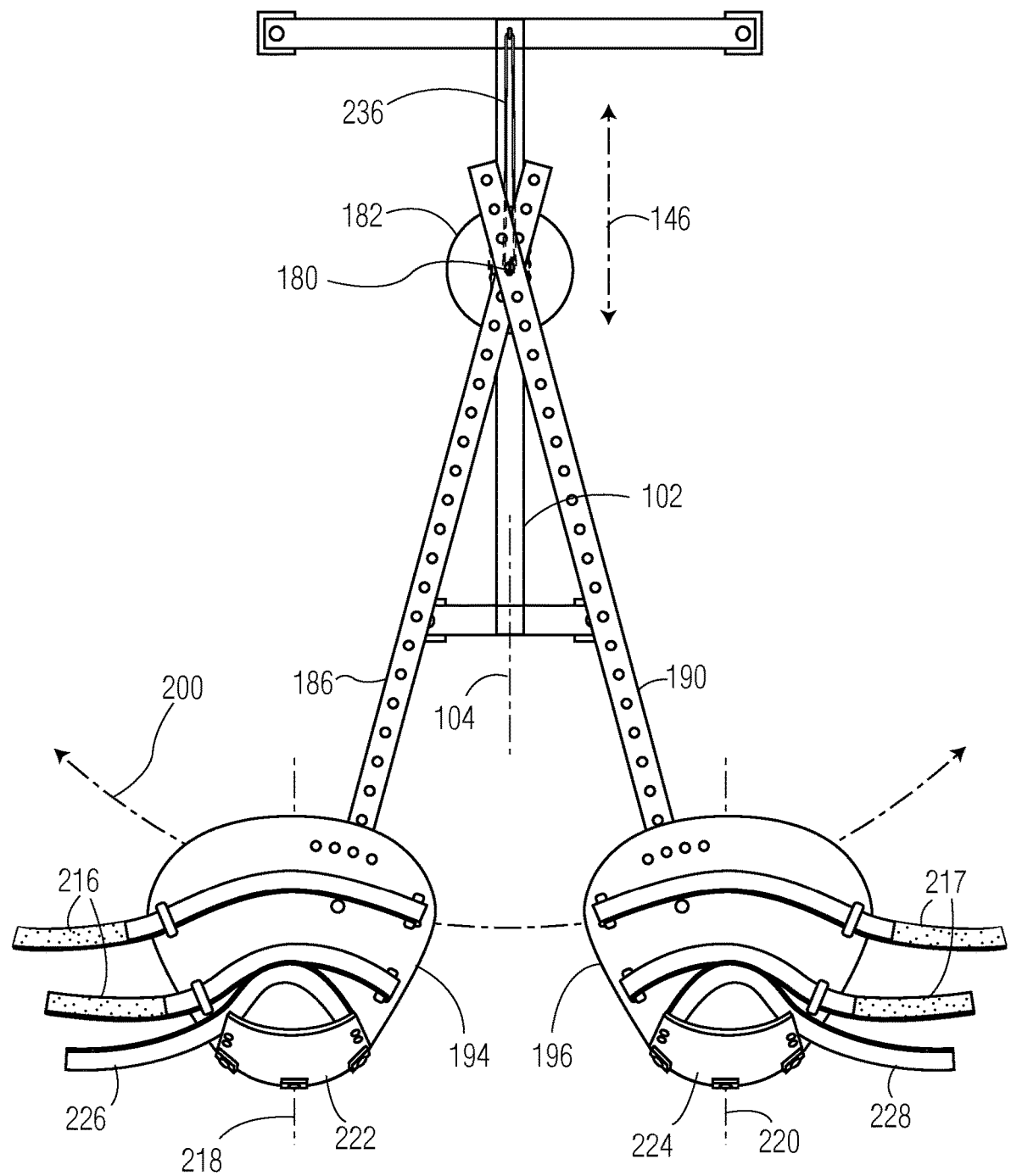
FIG. 12 illustrates a top view of an exemplary ski training apparatus, according to a preferred embodiment of the present invention.
Figure 20:
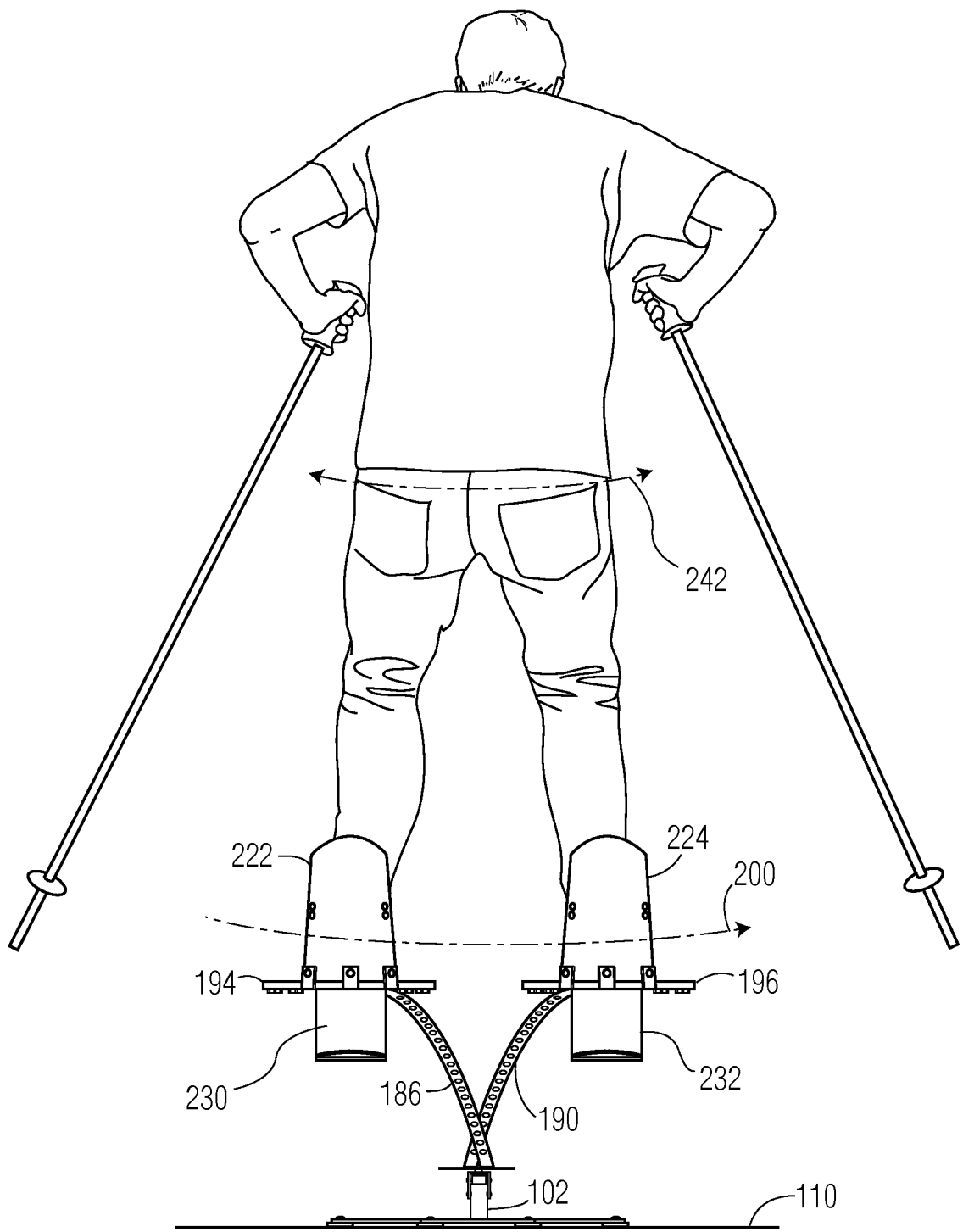
FIG. 20 illustrates a back view of an exemplary ski training apparatus, according to a preferred embodiment of the present invention, and illustrated with a user.

FIG. 12 and FIG. 20 illustrate that embodiments of the present invention enable longitudinal movement 146 of the sliding pivot point assembly 132 and respective radial movement (along 146) of a user's body, from a first position to a second position, through the user's frontal plane while laterally maneuvering and thus tangentially pivoting along arrow 242 (FIG. 20) and along arc 200 (FIG. 20) around the single pivot point 178, which engages the unparallel ski arms 186, 190 mounted on the sliding pivot point assembly 132. The elastic band 236 is illustrated in an elongated and stretched position in FIG. 12, which would be induced by radial and tangential forces exerted upon the cylindrical pivot point shaft 178 of the sliding pivot point assembly 132 by a user's laterally jumping movement through his/her sagittal plane. Embodiments of the present invention thus comprise a step of a user radially moving the user's body from a first position to a second position through the user's frontal plane while pivoting around the single pivot point 178 engaging the unparallel ski arms mounted on the sliding pivot point assembly 132.

The material, hardness, flexibility, and configuration of each ski arm 186, 190 may vary as a function of the height and weight of the user and his/her performance requirements, for example, how wide or far of a radially and axially jump a user intends to make utilizing embodiments of the present invention.

What is claimed is:

1. A snow ski training apparatus comprising:
a longitudinal T-beam having a central axis aligned generally from front to rear of the apparatus, said T-beam mounted between a front column and a rear column, each column having a base engaging the ground, the front column having a vertically extending eye-bolt positioned above the horizontal plane of the top of the T-beam;
a sliding pivot point assembly operatively engaging said T-beam for longitudinal movement therealong, said sliding pivot point assembly comprising:
a reverse U-shaped support frame having a horizontal wall and downwardly extending vertical walls sized to closely surround the flange of the T-beam;
an in line pair of roller wheels engaging the bottom surface of the flange of the T-beam on each side of the web of the T-beam for longitudinal movement along the length thereof, each pair of roller wheels operatively connected to the inside surface of one of the respective vertical walls of the support frame, each roller wheel being mounted rotating free on a spindle fixed to said respective vertical wall of the support frame;
a top roller wheel engaging the top surface of the flange of the T-beam for longitudinal movement along the length thereof, said top roller wheel being mounted rotating free on a spindle fixed between the vertical walls of the support frame;
a vertically extending cylindrical pivot point shaft fixed atop the horizontal wall of the support frame providing a single pivot point vertical axis moveable along the longitudinal axis of the T-beam, said pivot point shaft having an upper section opposite a lower section;
an achievement disk aligned concentric with and sized to closely and securely surround the lower section of the cylindrical pivot point shaft, said achievement disk having a plurality of markings inscribed thereon extending radially from the disc's intersection with the shaft to the outer perimeter of the disc for correlation between angles achieved in operation of the apparatus with varying degrees of difficulty of downhill turns in assimilation of parallel snow skiing;

an elongated first ski arm having a front end opposite a tail end; said first ski arm configured to pivotally mount onto the cylindrical pivot point shaft by said shaft vertically extending through a selected one of a plurality of holes spaced along the axial length of the first ski arm, allowing the first ski arm to freely pivot independently;

an elongated second ski arm disposed unparallel to the first ski arm having a front end opposite a tail end; said second ski arm configured to pivotally mount onto the cylindrical pivot point shaft by said shaft vertically extending through a selected one of a plurality of holes spaced along the axial length of the second ski arm, allowing the second ski arm to freely pivot independently;

a first foot pad selectively connected to the tail end of the first ski arm, wherein the selected connection is a fixed position with respect to the first ski arm, said fixed position configured by a bolt vertically extending through at least one of the holes disposed at the tail end of the ski arm into a selected one of a plurality of holes of the first foot pad configured to receive the bolt to position the first foot pad relative to the tail end of the ski arm, the first foot pad having laces mounted on the first foot pad in a spaced apart relationship on opposite sides of a longitudinal axis of the first foot pad, the laces being configured to hold a foot of the associated user of the exercise apparatus in a substantially fixed relationship relative to the first foot pad;

a second foot pad selectively connected to the tail end of the second ski arm, wherein the selected connection is a fixed position with respect to the second ski arm, said fixed position configured by a bolt vertically extending through at least one of the holes disposed at the tail end of the ski arm into a selected one of a plurality of holes of the second foot pad configured to receive the bolt to position the second foot pad relative to the tail end of the ski arm, the second foot pad having laces mounted on the second foot pad in a spaced apart relationship on opposite sides of a longitudinal axis of the second foot pad, the laces being configured to hold a foot of the associated user of the exercise apparatus in a substantially fixed relationship relative to the second foot pad;

an elastic band disposed between and configured to engage the eye-bolt and the cylindrical pivot point shaft to elastically return the pivot point assembly to an initial position responsively to longitudinal movement of the pivot point assembly caused by tangential and radial forces imposed by the ski arms on the cylindrical pivot point shaft of the pivot point assembly responsively to tangential and radial shifts in a user's center of weight.

2. The ski training apparatus of claim 1, further comprising a cylindrical bushing concentrically aligned with and sized to closely and securely surround the cylindrical pivot point shaft of the sliding pivot point assembly, said bushing vertically disposed between the performance achievement disc and the first ski arm.

3. The ski training apparatus of claim 1, wherein the selected one of a plurality of holes spaced along the axial length of the first ski arm is close to the front end of the ski arm, providing a longer ski arm.

4. The ski training apparatus of claim 1, wherein the selected one of a plurality of holes spaced along the axial length of the first ski arm is relatively farther from the front end of the ski arm, providing a shorter ski arm.

5. The ski training apparatus of claim 1, wherein the ski arms selectively overlap near the middle of the ski arms, at a point that closely surrounds and connects to the pivot shaft of the sliding pivot point assembly.

6. The ski training apparatus of claim 1, further comprising a heel rest connected to the first foot pad having laces configured to embrace the heel of the user.

7. A snow ski training apparatus comprising:

a pair of unparallel ski arms rotationally disposed and overlapping at a single vertical point of axis on a sliding pivot point assembly, wherein said single vertical point of axis comprises a cylindrical shaft extending upwardly through a concentrically aligned and overlapping hole of each said ski arm, said sliding pivot point assembly supported by a T-beam having a central axis aligned generally from front to rear of the apparatus, said sliding pivot point assembly operatively engaging said T-beam for longitudinal movement therealong, said T-beam mounted between a front column and a rear column, each column having a base engaging the ground;

said sliding pivot point assembly comprising a reverse U-shaped support frame having a horizontal wall and downwardly extending vertical walls sized to closely surround a flange of the T-beam;

an in line pair of roller wheels slidably engaging a bottom surface of the flange of the T-beam on each side of a web of the T-beam for longitudinal movement along the length thereof;

wherein each pair of roller wheels operatively connected to an inside surface of one of the respective vertical walls of the reverse U-shaped support frame;

a spindle fixed between the vertical walls of said reverse U-shaped support frame, wherein each roller wheel being mounted rotating free on said spindle;

a top surface of the flange of the T-beam being engaged by a top roller wheel for longitudinal movement along the length thereof, said top roller wheel being mounted rotating free on a spindle fixed between the vertical walls of the support frame;

a vertically extending cylindrical pivot point shaft fixed atop the horizontal wall of the reverse U-shaped support frame providing a single pivot point vertical axis moveable along a longitudinal axis of the T-beam, said pivot point shaft having an upper section opposite a lower section;

an achievement disk aligned concentric with and sized to closely and securely surround the lower section of the cylindrical pivot point shaft, said achievement disk having a plurality of markings inscribed thereon extending radially from the disc's intersection with the shaft to the outer perimeter of the disc for correlation between angles achieved in operation of the apparatus with varying degrees of difficulty of downhill turns in assimilation of parallel snow skiing;

wherein each pair of unparallel ski arms having a respective front end opposite a tail end, said each pair of unparallel ski arms respectively configured to pivotally mount onto the cylindrical pivot point shaft by said shaft vertically extending through a selected one of a plurality of holes spaced along the axial length of each pair of unparallel ski arms, allowing each pair of unparallel ski arms to freely pivot independently; and a pair of foot pads, each pair of foot pads selectively connected to each tail end of each pair of unparallel ski arms respectively, wherein the selected connection of each pair of foot pads is a respective fixed position with respect to each pair of unparallel ski arms, said respective fixed position configured by a respective bolt, each respective bolt vertically extending through at least one of the holes disposed at each tail end of each pair of unparallel ski arms into a selected one of a plurality of holes of each pair of foot pads configured to receive the respective bolt to position each pair of foot pads relative to each tail end of each pair of unparallel ski arms;

wherein the pair of foot pads having laces mounted on each pair of foot pads in a spaced apart relationship on opposite sides of a longitudinal axis of each pair of foot pads, said laces being configured to hold a foot of a user of the ski training apparatus in a substantially fixed relationship relative to each pair of foot pads.

8. The snow ski training apparatus of claim 7, wherein the front column has a vertically extending eye-bolt positioned above a horizontal plane of the top of the T-beam.

9. The snow ski training apparatus of claim 7, further comprising an elastic band coupled on one end to an eye-bolt mounted atop the front column and vertically positioned above a horizontal plane of the top of the T-beam, said elastic band coupled on a second end to the cylindrical shaft for repositioning of the sliding pivot point assembly during training and operation of the ski training apparatus by the user.

* * * * *